(12) United States Patent
Maeda et al.

(10) Patent No.: US 9,033,483 B2
(45) Date of Patent: May 19, 2015

(54) WATER-BASED INK SET FOR INK-JET RECORDING, WATER-BASED INK, AND INK-JET RECORDING METHOD

(75) Inventors: Mitsunori Maeda, Nagoya (JP); Ayako Ohishi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 422 days.

(21) Appl. No.: 13/444,233

(22) Filed: Apr. 11, 2012

(65) Prior Publication Data

US 2013/0083145 A1 Apr. 4, 2013

(30) Foreign Application Priority Data

Sep. 30, 2011 (JP) ................................ 2011-218400
Sep. 30, 2011 (JP) ................................ 2011-218401
Sep. 30, 2011 (JP) ................................ 2011-218402

(51) Int. Cl.
*B41J 2/01* (2006.01)
*C09D 11/328* (2014.01)
(Continued)

(52) U.S. Cl.
CPC ............. *C09D 11/328* (2013.01); *B41J 2/2107* (2013.01); *C09D 11/40* (2013.01); *C09D 11/54* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00

USPC ............ 347/100, 95, 96, 88, 99, 21, 20, 102, 347/101; 106/31.6, 31.27, 31.13; 523/160, 523/161

See application file for complete search history.

(56) References Cited

U.S. PATENT DOCUMENTS 6,027,210 A 2/2000 Kurabayashi et al.
6,174,354 B1 1/2001 Takizawa et al.
(Continued)

FOREIGN PATENT DOCUMENTS

CN 1172734 A 2/1998
EP 1398165 A2 3/2004
(Continued)

OTHER PUBLICATIONS

Notification of First Office Action mailed Dec. 17, 2013, CN Appln. 201210192881.2, English translation.
(Continued)

*Primary Examiner* — Manish S Shah
(74) *Attorney, Agent, or Firm* — Banner & Witcoff, Ltd.

(57) ABSTRACT

A water-based ink set for ink-jet recording, includes two or more water-based inks each of which contains a colorant, water, and a water-soluble organic solvent; wherein at least one ink among the two or more water-based inks contains a dye represented by a general formula (1), and at least one ink among the two or more water-based inks contains a cationic polymer:

(1)

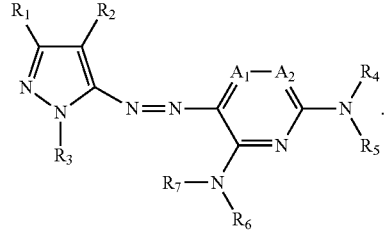

14 Claims, 2 Drawing Sheets

(51) Int. Cl.
*B41J 2/21* (2006.01)
*C09D 11/40* (2014.01)
*C09D 11/54* (2014.01)

(56) References Cited

U.S. PATENT DOCUMENTS

| | | | |
|---|---|---|---|
| 6,247,808 B1 * | 6/2001 | Ma et al. | 347/100 |
| 7,713,343 B2 | 5/2010 | Goto et al. | |
| 8,016,404 B2 | 9/2011 | Kato et al. | |
| 2004/0122219 A1 | 6/2004 | Fujiwara et al. | |
| 2005/0057629 A1 * | 3/2005 | Taguchi et al. | 347/100 |
| 2006/0100310 A1 | 5/2006 | Nakazawa et al. | |
| 2006/0221117 A1 | 10/2006 | Sato et al. | |
| 2006/0250463 A1 * | 11/2006 | Nakazawa et al. | 347/100 |
| 2007/0167537 A1 * | 7/2007 | Taguchi et al. | 523/160 |
| 2007/0173641 A1 * | 7/2007 | Fujiwara et al. | 534/753 |
| 2007/0186806 A1 | 8/2007 | Goto et al. | |
| 2007/0186807 A1 | 8/2007 | Goto et al. | |
| 2008/0151027 A1 | 6/2008 | Held et al. | |
| 2008/0241398 A1 | 10/2008 | Kato et al. | |
| 2011/0128332 A1 * | 6/2011 | Maeda et al. | 347/100 |
| 2011/0128333 A1 * | 6/2011 | Goto et al. | 347/100 |

FOREIGN PATENT DOCUMENTS

| | | |
|---|---|---|
| EP | 1462493 A1 | 9/2004 |
| JP | H08-333538 A | 12/1996 |
| JP | H09-188843 A | 7/1997 |
| JP | H10-114877 | 5/1998 |
| JP | H10-130555 | 5/1998 |
| JP | H10-204349 | 8/1998 |
| JP | H10-279859 A | 10/1998 |
| JP | H11-222568 A | 8/1999 |
| JP | 2002-69339 | 3/2002 |
| JP | 2002-069339 | 3/2002 |
| JP | 2002363459 A | 12/2002 |
| JP | 2004-292820 A | 10/2004 |
| JP | 2006205707 A | 8/2006 |
| JP | 2007-520585 A | 7/2007 |
| JP | 2007-217523 | 8/2007 |
| JP | 2007-217524 | 8/2007 |
| JP | 2007-217525 | 8/2007 |
| JP | 2007-217531 | 8/2007 |
| JP | 2007-271531 A | 8/2007 |
| JP | 2008-246821 | 10/2008 |
| JP | 2009-226642 A | 10/2009 |
| JP | 2010513672 A | 4/2010 |
| JP | 2011-001505 | 1/2011 |
| JP | 2012-187772 A | 10/2012 |
| WO | 2010149988 A1 | 12/2010 |

OTHER PUBLICATIONS

Extended European Search Report dated Aug. 22, 2013 in European Application No. 12161920.9.
Sep. 2, 2014—(CN) Notification of Second Office Action—App 201210192881.2.
Feb. 17, 2015 (JP)—Notice of Reasons for Rejection—App 2011-218400—Eng Tran.
Nov. 5, 2014—(JP) Notice of Reasons for Rejection—App 2011-218402—Eng Tran.

* cited by examiner

WATER-BASED INK SET FOR INK-JET RECORDING, WATER-BASED INK, AND INK-JET RECORDING METHOD

CROSS REFERENCE TO RELATED APPLICATION

The present application claims priority from Japanese Patent Applications No. 2011-218400, 2011-218401 and 2011-218402 filed on Sep. 30, 2011, the disclosure of which is incorporated herein by reference in its entirety.

BACKGROUND OF THE INVENTION

1. Field of the Invention

The present invention relates to a water-based ink set for ink-jet recording, a water-based ink, and an ink-jet recording method.

2. Description of the Related Art

In general, it is demanded for the water-based ink set for ink-jet recording that the hue is satisfactory and the durability or stoutness is excellent against light, heat, and ozone. A water-based ink set, which includes a water-based ink based on the use of a specified dye, has been suggested as the water-based ink set for ink-jet recording in which the hue is satisfactory the durability or stoutness is excellent against light, heat, and ozone.

However, some types of the specified dye as described above tend to cause the change in the easiness of diffusion into a recording medium depending on the change of the environmental condition for the use, as compared with general dyes. For example, the humidity affects the easiness of diffusion of the specified dye into the recording medium. For this reason, for example, when a water-based magenta ink, which contains the specified dye, is mixed with a water-based yellow ink and a water-based cyan ink on the recording medium to perform the recording with the process black (also referred to as "tri-color black" or "composite black"), then the color tone of magenta is weakened in the process black due to the diffusion of the specified dye in a high humidity environment, and the achromatic color (for example, a color within a range of gradation from the black color (black) to the gray color (gray)) appears as if the achromatic color is greenish.

In view of the above, an object of the present teaching is to provide a water-based ink set for ink-jet recording which provides a satisfactory hue, which is excellent in the durability or stoutness against light, heat, and ozone, and which makes it possible to suppress the color change of the secondary color on a recording medium in a high humidity environment.

Further, it is known that the water-based ink for ink-jet recording causes a phenomenon called "migration" in which the colorant blurs to the circumferential edge of the recorded portion after the recording on a recording medium. The migration tends to occur especially in a high humidity environment. In the ink-jet recording, two or more types of water-based inks are used to form a recorded portion of a secondary color in some cases. However, the recorded portion of the secondary color sometimes undergoes the color change depending on the degree of migration (migration level) of the water-based ink in the high humidity environment.

In order to suppress the migration, for example, the following procedure has been performed. That is, the color change, which is caused by the migration, is made inconspicuous by making the selection so that the maximum difference among the mutual migration levels is decreased in a plurality of water-based inks.

However, in the case of the conventional ink-jet recording method, it is necessary to mutually select the water-based inks in which the migration levels are relatively close to one another. A problem arises such that the range of selection of the water-based ink is narrow.

In view of the above, another object of the present teaching is to provide an ink-jet recording method which makes it possible to suppress the color change of a recorded portion of a secondary color in a high humidity environment even in the case of a combination of water-based inks in which the difference in the migration level is relatively large therebetween.

SUMMARY OF THE INVENTION

According to a first aspect of the present teaching, there is provided A water-based ink set for ink-jet recording, including:

two or more water-based inks each of which contains a colorant, water, and a water-soluble organic solvent;

wherein at least one ink among the two or more water-based inks contains a dye represented by a general formula (1), and at least one ink among the two or more water-based inks contains a cationic polymer:

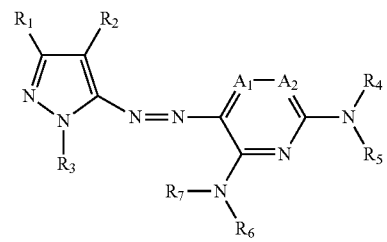

(1)

in the general formula (1):

$R_1$ represents a hydrogen atom, a substituted or unsubstituted alkyl group, or a substituted or unsubstituted aryl group; and $R_2$ represents a hydrogen atom, a halogen atom, or a cyano group;

$R_3$ represents a hydrogen atom, a substituted or unsubstituted alkyl group, a substituted or unsubstituted aryl group, or a substituted or unsubstituted heterocyclic group;

each of $R_4$, $R_5$, $R_6$, and $R_7$ is a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group; $R_4$, $R_5$, $R_6$, and $R_7$ are identical with each other or different from each other; $R_4$ and $R_5$ are not simultaneously the hydrogen atom; and $R_6$ and $R_7$ are not simultaneously the hydrogen atom; and both of $A_1$ and $A_2$ are substituted or unsubstituted carbon atoms, or one of $A_1$ and $A_2$ is a substituted or unsubstituted carbon atom and the other of $A_1$ and $A_2$ is a nitrogen atom.

According to a second aspect of the present teaching, there is provided a water-based ink included in the water-based ink set for ink-jet recording as defined in the first aspect; wherein the water-based ink contains the dye represented by the general formula (1) and the cationic polymer.

According to a third aspect of the present teaching, there is provided an ink jet recording method for performing recording on a recording medium; including preparing two or more types of water-based inks each containing a colorant, water, and a water-soluble organic solvent; and overprinting the two or more water-based inks, wherein at least one of following Condition (V) and following Condition (VI) is fulfilled:

Condition (V): the water-based ink of the two or more water-based inks to be overprinted, which has a maximum migration level, contains a cationic polymer; and Condition (VI): the water-based ink of the two or more water-based inks to be overprinted, which arrives at the recording medium before or simultaneously with the water-based ink having the maximum migration level, contains the cationic polymer.

DESCRIPTION OF THE PREFERRED EMBODIMENTS

[Water-based Ink Set for Ink-jet Recording]

Figure 1:
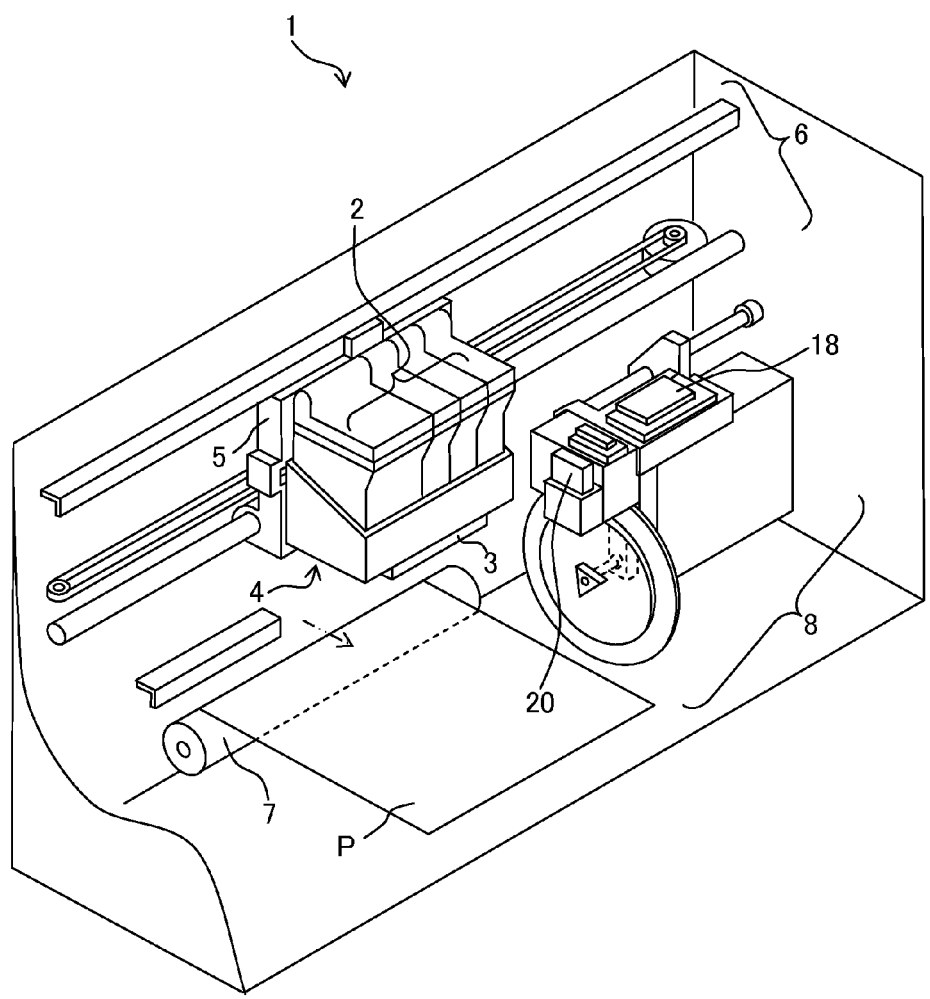
FIG. 1 shows a schematic perspective view illustrating an exemplary arrangement of an ink-jet recording apparatus according to the present teaching.

An explanation will be made about an embodiment of the water-based ink set for ink-jet recording (hereinafter referred to as "water-based ink set" or "ink set" in some cases) of the present teaching. However, the embodiment described below is described merely exemplarily, and the present teaching is not limited thereto.

In the water-based ink set for ink-jet recording of the present teaching, at least one of following Conditions (I) and (II) is fulfilled:

Condition (I): the dye represented by the general formula (1) is contained in at least one water-based ink among the two or more water-based inks and the cationic polymer is contained in at least one different water-based ink, among the two or more water-based inks, which is different from the at least one ink containing the dye represented by the general formula (1);

Condition (II): both the dye represented by the general formula (1) and the cationic polymer are contained in at least one ink among the two or more water-based inks.

<First Embodiment>

This embodiment resides in such a mode that the dye represented by the general formula (1) and the cationic polymer are blended in different water-based inks respectively, i.e., a mode which fulfills Condition (I) described above. In this embodiment, the water-based ink for ink-jet recording (hereinafter referred to as "water-based ink" or "ink" in some cases), which contains the dye represented by the general formula (1), is designated as "first water-based ink", and the water-based ink, in which the cationic polymer is blended, is designated as "second water-based ink".

(a) First Water-Based Ink

The first water-based ink contains a colorant, water, and a water-soluble organic solvent. The colorant of the first water-based ink contains the dye represented by the general formula (1).

As described above, in the general formula (1);

$R_1$ represents a hydrogen atom, a substituted or unsubstituted alkyl group, or a substituted or unsubstituted aryl group, $R_2$ represents a hydrogen atom, a halogen atom, or a cyano group;

$R_3$ represents a hydrogen atom, a substituted or unsubstituted alkyl group, a substituted or unsubstituted aryl group, or a substituted or unsubstituted heterocyclic group;

each of $R_4$, $R_5$, $R_6$, and $R_7$ is a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, $R_4$, $R_5$, $R_6$, and $R_7$ are identical with each other or different from each other, $R_4$ and $R_5$ are not simultaneously the hydrogen atom, and $R_6$ and $R_7$ are not simultaneously the hydrogen atom; and both of $A_1$ and $A_2$ are substituted or unsubstituted carbon atoms, or one of $A_1$ and $A_2$ is a substituted or unsubstituted carbon atom and the other is a nitrogen atom.

In the general formula (1), the substituted or unsubstituted alkyl group is preferably an alkyl group having a number of carbon atom or atoms of 1 to 6. The substituted or unsubstituted alkyl group is exemplified, for example, by methyl group, ethyl group, n-butyl group, isopropyl group, tert-butyl group, hydroxyethyl group, methoxyethyl group, cyanoethyl group, trifluoromethyl group, 3-sulfopropyl group, and 4-sulfobutyl group. The substituent of the substituted alkyl group is exemplified, for example, by hydroxyl group; alkoxy group such as methoxy group, ethoxy group and the like; cyano group; halogen atom such as fluorine atom, chlorine atom, bromine atom, iodine atom and the like; and ionic hydrophilic group such as carbonate, sulfonate and the like.

In the general formula (1), the substituted or unsubstituted aryl group is preferably an aryl group having a number of carbon atoms of 6 to 12. However, in the case of the substituted aryl group, the number of carbon atoms does not include a number of carbon atom or atoms of the substituent. The substituted or unsubstituted aryl group is exemplified, for example, by phenyl group, naphthyl group, p-tolyl group, p-octylphenyl group, mesityl group, p-methoxyphenyl group, p-chlorophenyl group, and m-(3-sulfopropylamino) phenyl group. The substituent of the substituted aryl group is exemplified, for example, by alkyl group such as methyl group, ethyl group, isopropyl group, tert-butyl group, n-octyl group and the like; the same or equivalent alkoxy group as that described above; the same or equivalent halogen atom as that described above; alkylamino group such as methylamino group, dimethylamino group and the like; amide group; carbamoyl group; sulfamoyl group; sulfoamide group; hydroxyl group; ester group such as methoxycarbonyl group, ethoxycarbonyl group and the like; the same or equivalent ionic hydrophilic group as that described above.

In the general formula (1), the halogen atom is exemplified, for example, by fluorine atom, chlorine atom, bromine atom, and iodine atom.

In the general formula (1), the substituted or unsubstituted heterocyclic group is preferably 5-membered or 6-membered heterocyclic group. The substituted or unsubstituted heterocyclic group is exemplified, for example, by 2-pyridyl group, 2-thienyl group, 2-thiazolyl group, 2-benzothiazolyl group, 2-furyl group, 6-sulfobenzothiazolyl group, and 6-sulfonate benzothiazolyl group. The substituent of the substituted heterocyclic group is exemplified, for example, by amide group; carbamoyl group; sulfamoyl group; sulfoamide group; hydroxyl group; the same or equivalent ester group as that described above; and the same or equivalent ionic hydrophilic group as that described above.

In the general formula (1), the substituted or unsubstituted sulfonyl group is exemplified, for example, by methylsulfonyl group and phenylsulfonyl group. The substituent of the substituted sulfonyl group is exemplified, for example, by the same or equivalent substituted or unsubstituted alkyl group as that described above and the same or equivalent substituted or unsubstituted aryl group as that described above.

In the general formula (1), the substituted or unsubstituted acyl group is preferably an acyl group having a number of carbon atom or atoms of 1 to 12. However, in the case of the substituted acyl group, the number of carbon atom or atoms does not include a number of carbon atom or atoms of the substituent. The substituted or unsubstituted acyl group is exemplified, for example, by acetyl group, benzoyl group, and chloroacetyl group. The substituent of the substituted acyl group is exemplified, for example, by the same or equivalent ionic hydrophilic group as that described above.

In the general formula (1), as described above, both of $A_1$ and $A_2$ are substituted or unsubstituted carbon atoms, or one of $A_1$ and $A_2$ is a substituted or unsubstituted carbon atom and the other is a nitrogen atom. The structure, in which both of $A_1$ and $A_2$ are carbon atoms, is preferred in that more excellent performance can be exhibited. The substituent, which is bonded to the carbon atoms of $A_1$ and $A_2$, is exemplified, for example, by alkyl group having a number of carbon atom or atoms of 1 to 3, carboxyl group, carbamoyl group, and cyano group.

As described above, in the general formula (1), $R_4$ and $R_5$ are not simultaneously the hydrogen atom, and $R_6$ and $R_7$ are not simultaneously the hydrogen atom as well. In the general formula (1), there is such a tendency that the water solubility of the dye is improved when the number of substituents of the sulfonic acid group or the carboxyl group is increased. Therefore, it is preferable that the number of substituents is adjusted, if necessary.

The preferred form of the dye represented by the general formula (1) is exemplified, for example, by such a form that $R_1$ is alkyl group, $R_2$ is cyano group, $R_3$ is hydrogen atom or substituted or unsubstituted heterocyclic group, $R_4$ is hydrogen atom, substituted or unsubstituted heterocyclic group, or substituted aryl group, $R_5$ and $R_6$ are substituted heterocyclic groups or substituted aryl groups respectively, $R_7$ is hydrogen atom, $A_1$ is substituted carbon atom, and $A_2$ is substituted or unsubstituted carbon atom in the general formula (1).

The more preferred form of the dye represented by the general formula (1) is exemplified, for example, by such a form that $R_1$ is tert-butyl group, $R_2$ is cyano group, $R_3$ is hydrogen atom or benzothiazolyl group which may be substituted with sulfonic acid group or alkali metal salt group thereof (preferably benzothiazole-2-yl group), $R_4$ is hydrogen atom, benzothiazolyl group which may be substituted with sulfonic acid group or alkali metal salt group thereof (preferably benzothiazole-2-yl group), or trialkylphenyl group which is substituted with sulfonic acid group or alkali metal salt group thereof (preferably mesityl group), $R_5$ and $R_6$ are mono-, di-, or trialkylphenyl groups which may be substituted with sulfonic acid group or alkali metal salt group thereof (preferably p-octylphenyl groups or mesityl groups) or benzothiazolyl groups which are substituted with sulfonic acid group or alkali metal salt group thereof (preferably benzothiazole-2-yl group) respectively, $R_7$ is hydrogen atom, $A_1$ is substituted carbon atom, and $A_2$ is carbon atom which may be substituted with cyano group in the general formula (1).

Preferable specified examples of the dye represented by the general formula (1) are exemplified by compounds represented by chemical formulas (1-A) to (1-F).

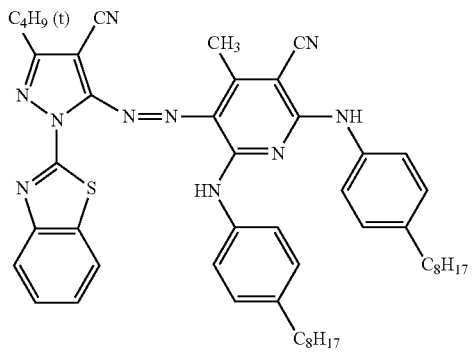

(1-A)

The compound represented by the chemical formula (1-A) resides in such a form that $R_1$ is tert-butyl group, $R_2$ is cyano group, $R_3$ is benzothiazole-2-yl group, $R_4$ is hydrogen atom, $R_5$ and $R_6$ are p-octylphenyl groups respectively, $R_7$ is hydrogen atom, $A_1$ is carbon atom substituted with methyl group, and $A_2$ is carbon atom substituted with cyano group in the general formula (1).

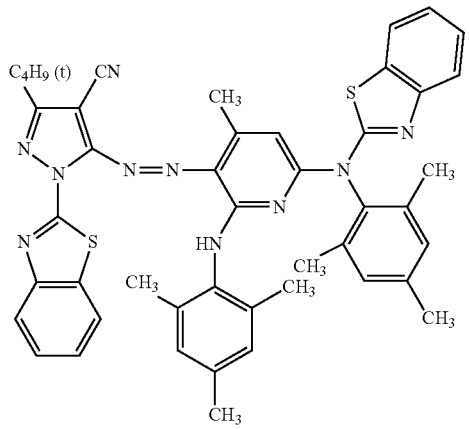

(1-B)

The compound represented by the chemical formula (1-B) resides in such a form that $R_1$ is tert-butyl group, $R_2$ is cyano group, $R_3$ and $R_4$ are benzothiazole-2-yl groups respectively, $R_5$ and $R_6$ are mesityl groups respectively, $R_7$ is hydrogen atom, $A_1$ is carbon atom substituted with methyl group, and $A_2$ is carbon atom in the general formula (1).

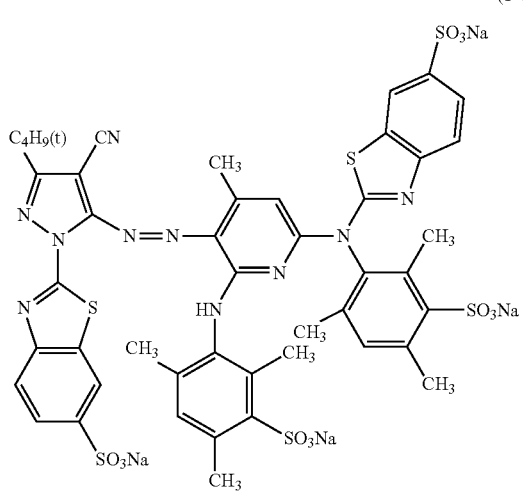

(1-C)

The compound represented by the chemical formula (1-C) resides in such a form that $R_1$ is tert-butyl group, $R_2$ is cyano group, $R_3$ and $R_4$ are 6-sulfosodium salt benzothiazole-2-yl groups respectively, $R_5$ and $R_6$ are 3-sulfosodium salt mesityl groups respectively, $R_7$ is hydrogen atom, $A_1$ is carbon atom substituted with methyl group, and $A_2$ is carbon atom in the general formula (1).

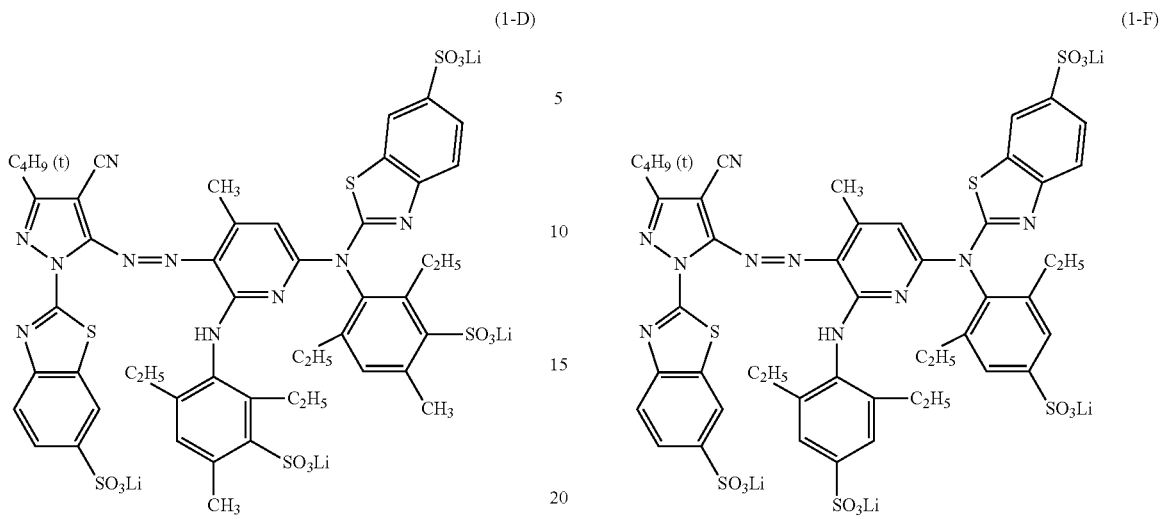

(1-D)

The compound represented by the chemical formula (1-D) resides in such a form that $R_1$ is tert-butyl group, $R_2$ is cyano group, $R_3$ and $R_4$ are 6-sulfolithium salt benzothiazole-2-yl groups respectively, $R_5$ and $R_6$ are 2,6-diethyl-4-methyl-3-sulfolithium salt phenyl groups respectively, $R_7$ is hydrogen atom, $A_1$ is carbon atom substituted with methyl group, and $A_2$ is carbon atom in the general formula (1).

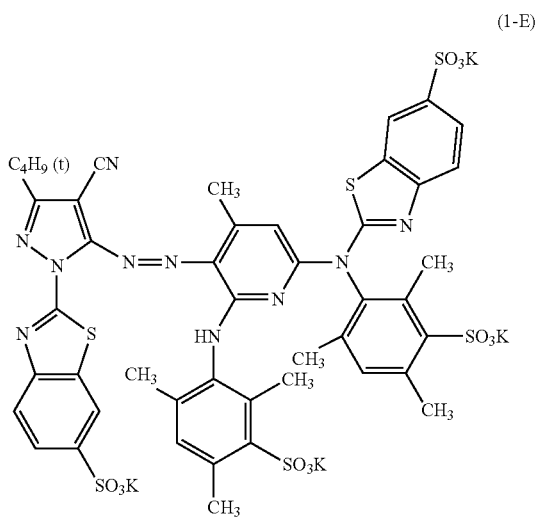

(1-E)

The compound represented by the chemical formula (1-E) resides in such a form that $R_1$ is tert-butyl group, $R_2$ is cyano group, $R_3$ and $R_4$ are 6-sulfopotassium salt benzothiazole-2-yl groups respectively, $R_5$ and $R_6$ are 3-sulfopotassium salt mesityl groups respectively, $R_7$ is hydrogen atom, $A_1$ is carbon atom substituted with methyl group, and $A_2$ is carbon atom in the general formula (1).

(1-F)

The compound represented by the chemical formula (1-F) resides in such a form that $R_1$ is tert-butyl group, $R_2$ is cyano group, $R_3$ and $R_4$ are 6-sulfolithium salt benzothiazole-2-yl groups respectively, $R_5$ and $R_6$ are 2,6-diethyl-4-sulfolithium salt phenyl groups respectively, $R_7$ is hydrogen atom, $A_1$ is carbon atom substituted with methyl group, and $A_2$ is carbon atom in the general formula (1).

The blending amount of the dye represented by the general formula (1) with respect to the total amount of the first water-based ink is not specifically limited. When the dye represented by the general formula (1) is contained, it is possible to obtain the water-based ink which provides the satisfactory hue and which is excellent in the durability or stoutness against light, heat, and ozone. The blending amount of the dye represented by the general formula (1) with respect to the total amount of the first water-based ink is, for example, 0.1% by weight to 10% by weight, preferably 0.5% by weight to 8% by weight, and more preferably 1% by weight to 6% by weight.

The colorant of the first water-based ink may further contain, for example, any other dye and any pigment in addition to the dye represented by the general formula (1).

It is preferable that the water used for the first water-based ink is ion exchange water or pure water. The blending amount of water (water ratio) with respect to the total amount of the first water-based ink is, for example, 10% by weight to 90% by weight, and preferably 40% by weight to 80% by weight. The water ratio may be, for example, the balance of the other components.

The water-soluble organic solvent of the first water-based ink is exemplified, for example, by a humectant which prevents the water-based ink from being dried at the nozzle forward end portion of the ink-jet head and a penetrant which adjusts the drying speed on the recording medium.

The humectant described above is not specifically limited, which includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyhydric alcohols such as polyalkylene glycols, alkylene glycols, glycerol and trimethylolpropane; 2-pyrrolidone; N-methyl-2-pyrrolidone; and 1,3-dimethyl-2-imidazolidinone. The polyalkylene glycol includes, for example, polyethylene glycol and polypropylene glycol. The alkylene glycol includes, for example, ethylene glycol, propylene glycol, butylene glycol, diethylene glycol, triethylene glycol, dipropylene glycol, tripropylene glycol, thiodiglycol, and hexylene glycol. One type of the humectant as described above may be used singly, or two or more types of the humectants as described above may be used in combination. Among them, it is preferable to use polyhydric alcohol such as alkylene glycol and glycerol.

The blending amount of the humectant with respect to the total amount of the first water-based ink is, for example, 0% by weight to 95% by weight, preferably 5% by weight to 80% by weight, and more preferably 5% by weight to 50% by weight.

The penetrant includes, for example, glycol ether. Glycol ether includes, for example, ethylene glycol methyl ether, ethylene glycol ethyl ether, ethylene glycol n-propyl ether, diethylene glycol methyl ether, diethylene glycol ethyl ether, diethylene glycol n-propyl ether, diethylene glycol n-butyl ether, diethylene glycol n-hexyl ether, triethylene glycol methyl ether, triethylene glycol ethyl ether, triethylene glycol n-propyl ether, triethylene glycol n-butyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, tripropylene glycol n-propyl ether, and tripropylene glycol n-butyl ether. One type of the penetrant as described above may be used singly, or two or more types of the penetrants as described above may be used in combination.

The blending amount of the penetrant with respect to the total amount of the first water-based ink is, for example, 0% by weight to 20% by weight, preferably 0.1% by weight to 15% by weight, and more preferably 0.5% by weight to 10% by weight.

The first water-based ink may further contain conventionally known additives, if necessary. The additive includes, for example, surfactants, pH-adjusting agents, viscosity-adjusting agents, surface tension-adjusting agents, and fungicides. The viscosity-adjusting agent includes, for example, polyvinyl alcohol, cellulose, and water-soluble resin.

The first water-based ink can be prepared, for example, such that the colorant, water, the water-soluble organic solvent, and optionally other additive components are mixed uniformly or homogeneously by any conventionally known method, and undissolved matters are removed by a filter or the like.

The first water-based ink can be used, for example, as a water-based magenta ink. However, the present teaching is not limited thereto. The first water-based ink can be also provided as a water-based ink having a color other than magenta, by using a colorant other than the dye represented by the general formula (1).

(b) Second Water-Based Ink

The second water-based ink contains a colorant, water, and a water-soluble organic solvent.

The colorant of the second water-based ink may be either a dye or a pigment. The dye and the pigment may be mixed and used as the colorant of the second water-based ink. The pigment is not specifically limited, for which it is possible to use, for example, carbon black, inorganic pigment, and organic pigments. When the pigment is used, it is preferable to use a dispersant in combination.

The dye is not specifically limited, which is exemplified, for example, by direct dyes, acid dyes, basic dyes, and reactive dyes. Specified examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, and C. I. Food Black. C. I. Direct Black is exemplified, for example, by C. I. Direct Blacks 17, 19, 32, 51, 71, 108, 146, 154, and 168. C. I. Direct Blue is exemplified, for example, by C. I. Direct Blues 6, 22, 25, 71, 86, 90, 106, and 199. C. I. Direct Red is exemplified, for example, by C. I. Direct Reds 1, 4, 17, 28, 83, and 227. C. I. Direct Yellow is exemplified, for example, by C. I. Direct Yellows 12, 24, 26, 86, 98, 132, 142, and 173. C. I. Direct Orange is exemplified, for example, by C. I. Direct Oranges 34, 39, 44, 46, and 60. C. I. Direct Violet is exemplified, for example, by C. I. Direct Violets 47 and 48. C. I. Direct Brown is exemplified, for example, by C. I. Direct Brown 109. C. I. Direct Green is exemplified, for example, by C. I. Direct Green 59. C. I. Acid Black is exemplified, for example, by C. I. Acid Blacks 2, 7, 24, 26, 31, 52, 63, 112, and 118. C. I. Acid Blue is exemplified, for example, by C. I. Acid Blues 9, 22, 40, 59, 93, 102, 104, 117, 120, 167, 229, and 234. C. I. Acid Red is exemplified, for example, by C. I. Acid Reds 1, 6, 32, 37, 51, 52, 80, 85, 87, 92, 94, 115, 180, 256, 289, 315, and 317. C. I. Acid Yellow is exemplified, for example, by C. I. Acid Yellows 11, 17, 23, 25, 29, 42, 61, and 71. C. I. Acid Orange is exemplified, for example, by C. I. Acid Oranges 7 and 19. C. I. Acid Violet is exemplified, for example, by C. I. Acid Violet 49. C. I. Basic Black is exemplified, for example, by C. I. Basic Black 2. C. I. Basic Blue is exemplified, for example, by C. I. Basic Blues 1, 3, 5, 7, 9, 24, 25, 26, 28, and 29. C. I. Basic Red is exemplified, for example, by C. I. Basic Reds 1, 2, 9, 12, 13, 14, and 37. C. I. Basic Violet is exemplified, for example, by C. I. Basic Violets 7, 14, and 27. C. I. Food Black is exemplified, for example, by C. I. Food Blacks 1 and 2. Other than these dyes, for example, compounds, which are represented by chemical formulas (Ya) to (Ye) and chemical formulas (Ca) to (Ce) used in Examples described later on, can be also preferably used as the dye.

The blending amount of the dye with respect to the total amount of the second water-based ink is not specifically limited, which is, for example, 0.1% by weight to 20% by weight and preferably 0.3% by weight to 10% by weight.

One type of the colorant of the second water-based ink may be used singly. Alternatively, two or more types of the colorants may be used in combination.

The blending amount of the solid content of the pigment with respect to the total amount of the second water-based ink (pigment solid content amount) is not specifically limited, which can be appropriately determined depending on, for example, the desired optical density and the coloration or colorfulness. The pigment solid content amount is, for example, 0.1% by weight to 20% by weight, preferably 1% by weight to 10% by weight, and more preferably 2% by weight to 8% by weight. It is desirable to add a dispersant when the pigment is used.

The water and the water-soluble organic solvent, which are used for the second water-based ink, are the same as or equivalent to the water and the water-soluble organic solvent which are used for the first water-based ink.

The second water-based ink further contains the cationic polymer. It is estimated that the color change of the secondary color on the recording medium is suppressed in the high humidity environment by containing the cationic polymer. In particular, when the glossy paper is used as the recording medium, it is estimated that the filling effect is exerted by the interaction between the cationic polymer and the silica particles on the glossy paper, the change of the easiness of diffusion (migration) of the dye on the glossy paper, which is caused depending on the humidity, is suppressed, and the color change of the secondary color on the recording medium is consequently suppressed. However, the present teaching is not limited to this estimation.

It is preferable that the cationic polymer is at least one compound of the compound represented by the general formula (2), the compound represented by the general formula (3), the compound represented by the general formula (4), and the compound (polyethyleneimine) represented by the general formula (5).

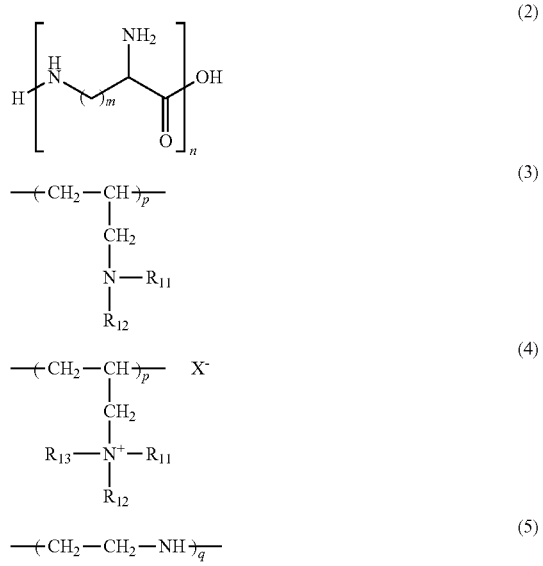

In the general formula (2), m is an integer of 2 to 6, and n is an integer of 20 to 40.

In the general formula (2), it is especially preferable that m is 4. In this case, the compound represented by the general formula (2) is polylysine. In the general formula (2), it is preferable that n is 25 to 35.

The compound represented by the general formula (2) may include any derivative of the compound represented by the general formula (2). When any isomer, which includes, for example, tautomers and stereoisomers (for example, geometrical isomer, conformational isomer, and stereoisomer), exists in relation to the compound represented by the general formula (2) or the derivative thereof, any one of the isomers can be used for the present teaching. Salts of the compound represented by the general formula (2) and the derivative thereof can be also used for the present teaching in the same manner as described above. The salt may be either an acid addition salt or a base addition salt. The acid, which forms the acid addition salt, may be either an inorganic salt or an organic salt. The base, which forms the base addition salt, may be either an inorganic base or an organic base. The inorganic acid is not specifically limited. However, the inorganic acid is exemplified, for example, by hydrochloric acid, sulfuric acid, phosphoric acid, hydrofluoric acid, hydrobromic acid, hydroiodic acid, hypofluorous acid, hypochlorous acid, hypobromous acid, hypoiodous acid, fluorous acid, chlorous acid, bromous acid, iodous acid, fluoric acid, chloric acid, bromic acid, iodic acid, perfluoric acid, perchloric acid, perbromic acid, and periodic acid. The organic acid is not specifically limited as well. However, the organic acid is exemplified, for example, by glutamic acid, p-toluenesulfonic acid, methanesulfonic acid, oxalic acid, p-bromobenzenesulfonic acid, carbonic acid, succinic acid, citric acid, benzoic acid, acetic acid, hydroxycarboxylic acid, propionic acid, malonic acid, adipic acid, fumaric acid, and maleic acid. The inorganic base is not specifically limited. However, the inorganic base is exemplified, for example, by ammonium hydroxide, alkali metal hydroxide, alkaline earth metal hydroxide, carbonate, hydrogen carbonate, and sulfate. More specifically, the inorganic base is exemplified, for example, by sodium hydroxide, potassium hydroxide, potassium carbonate, sodium carbonate, sodium hydrogen carbonate, potassium hydrogen carbonate, calcium hydroxide, calcium carbonate, potassium sulfate, and calcium sulfate. The organic base is not specifically limited as well. However, the organic base is exemplified, for example, by alcoholamine, trialkylamine, tetraalkylammonium, and tris(hydroxymethyl)aminomethane. The alcoholamine is exemplified, for example, by ethanolamine The trialkylamine is exemplified, for example, by trimethylamine, triethylamine, tripropylamine, tributylamine, and trioctylamine The tetraalkylammonium is exemplified, for example, by tetramethylammonium, tetraethylammonium, tetrapropylammonium, tetrabutylammonium, and tetraoctylammonium.

In the general formulas (3) and (4), $R_{11}$ to $R_{13}$ are hydrogen atoms or organic groups respectively. The organic group is exemplified, for example, by alkyl group and aryl group. The alkyl group may have either straight chain or branched chain, which is exemplified, for example, by methyl group, ethyl group, n-propyl group, isopropyl group, n-butyl group, isobutyl group, sec-butyl group, tert-butyl group, n-hexyl group, cyclohexyl group, n-octyl group, 2-ethylhexyl group, n-decyl group, n-dodecyl group, octadecyl group, 1,3-butadienyl group, and 1,3-pentadienyl group. The aryl group is exemplified, for example, by phenyl group, naphthyl group, tolyl group, and vinylphenyl group. The alkyl group and the aryl group may have any substituent. The alkyl group and the aryl group, which have the substituent, are exemplified, for example, by fluoroethyl group, trifluoroethyl group, methoxyethyl group, phenoxyethyl group, hydroxyphenylmethyl group, chlorophenyl group, dichlorophenyl group, trichlorophenyl group, bromophenyl group, iodophenyl group, fluorophenyl group, hydroxyphenyl group, methoxyphenyl group, cetoxyphenyl group, and cyanophenyl group.

In the general formula (4), $X^-$ is an anion. The anion may be any anion. However, the anion is exemplified, for example, by halide ion, sulfonic acid ion, alkylsulfonic acid ion, arylsulfonic acid ion, alkylcarboxylic acid ion, and arylcarboxylic acid ion.

In the general formulas (3) and (4), p is a positive integer, which is, for example, 10 to 400, preferably 15 to 300, and more preferably 20 to 200. The weight average molecular weight of each of the compounds represented by the general formulas (3) and (4) is not specifically limited. However, the weight average molecular weight is, for example, 600 to 20000, preferably 900 to 15000, and more preferably 1200 to 10000.

In the general formula (3), it is especially preferable that $R_{11}$ and $R_{12}$ are hydrogen atoms. In this case, the compound represented by the general formula (3) is polyallylamine In the general formula (4), it is preferable that $R_{11}$ to $R_{13}$ are hydrogen atoms, and $X^-$ is chloride ion. In this case, the compound represented by the general formula (4) is polyallylamine hydrochloride (allylamine hydrochloride polymer).

In the general formula (5), q is a positive integer, which is, for example, 12 to 500, preferably 20 to 350, and more preferably 28 to 250. Straight chain polyethyleneimine is shown in the general formula (5). However, the cationic polymer may be polyethyleneimine having branched chain structure including primary, secondary, and tertiary amines.

It is also allowable to use those other than the compound represented by the general formula (2), the compound represented by the general formula (3), the compound represented by the general formula (4), and the compound represented by the general formula (5) as the cationic polymer. The cationic polymer other than the compound represented by the general formula (2), the compound represented by the general formula (3), the compound represented by the general formula (4), and the compound represented by the general formula (5) is exemplified, for example, by polyamine, polyvinylamine, polyvinylpyridine, polyethyleneimine-epichlorohydrin reaction product, polyamide-polyamine resin, polyamide-epichlorohydrin resin, cationic starch, polyvinyl alcohol, polyvinylpyrrolidone, polyamidine, cationic epoxy resin, polyacrylamide, polyacrylic acid ester, polymethacrylic acid ester, polyvinyl formamide, aminoacetalized polyvinyl alcohol, polyvinyl benzyl onium, dicyandiamide-formalin polycondensate, dicyandiamide-diethylenetriamine polycondensate, epichlorohydrin-dimethylamine addition polymer, dimethyldiallylammonium chloride-$SO_2$ copolymer, dimethyldiallylammonium chloride polymer, and derivatives thereof. Further, the cationic polymer other than the compound represented by the general formula (2), the compound represented by the general formula (3), the compound represented by the general formula (4), and the compound represented by the general formula (5) is also exemplified, for example, by a polymer of single monomer or a copolymer of a plurality of types of monomers composed of at least one of water-soluble monomers including, for example, dimethylaminoethyl methacrylate (DM), methacryloxyethyl trimethyl ammonium chloride (DMC), methacryloxyethyl benzyl dimethyl ammonium chloride (DMBC), dimethylaminoethyl acrylate (DA), acryloyloxyethyl trimethyl ammonium chloride (DMQ), acryloyloxyethyl benzyl dimethyl ammonium chloride (DABC), dimethylaminopropyl acrylamide (DMAPAA), and acrylamide propyl trimethyl ammonium chloride (DMAPAAQ).

The cationic polymer may be prepared privately or independently, or any commercially available product may be used for the cationic polymer. The commercially available product is exemplified, for example, by polylysine produced by Chisso Corporation, "PAA (trade name)-01", "PAA (trade name)-03", "PAA (trade name)-08", and "PAA (trade name)-15" produced by Nitto Boseki Co., Ltd., and polyethyleneimine produced by Junsei Chemical Co., Ltd.

The weight average molecular weight of the cationic polymer is, for example, 600 to 20000, preferably 900 to 15000, and more preferably 1200 to 10000. The blending amount of the cationic polymer with respect to the total amount of the water-based ink is, for example, 0.2% by weight to 6% by weight, preferably 0.5% by weight to 4.5% by weight, and more preferably 1% by weight to 3% by weight. It is especially preferable that the weight average molecular weight of the cationic polymer is not less than 1200, and the blending amount of the cationic polymer with respect to the total amount of the second water-based ink is not less than 0.5% by weight. One cationic polymer may be used singly, or two or more cationic polymers may be used in combination.

The second water-based ink may further contain the same or equivalent additive as that of the first water-based ink, if necessary.

The second water-based ink can be prepared, for example, such that the colorant, water, the water-soluble organic solvent, the cationic polymer, and optionally other additive components are mixed uniformly in accordance with any conventionally known method, and undissolved matters are removed by a filter or the like.

The water-based ink set of this embodiment may be constructed by only the first water-based ink and the second water-based ink. Alternatively, the water-based ink set of this embodiment may include another water-based ink. The another water-based ink can be prepared, for example, in the same manner as the second water-based ink except that it is unnecessary to contain the cationic polymer.

<Second Embodiment>

This embodiment resides in such a mode that both of the dye represented by the general formula (1) and the cationic polymer are blended in an identical water-based ink, i.e., such a mode that Condition (II) described above is fulfilled. The water-based ink set of this embodiment can be prepared in the same manner as the water-based ink set of the first embodiment except that the first water-based ink is allowed to further contain the cationic polymer and that it is unnecessary for the second water-based ink to contain the cationic polymer.

The water-based ink used in this embodiment, which contains both of the dye represented by the general formula (1) and the cationic polymer, provides the satisfactory hue and the water-based ink is excellent in the durability or stoutness against light, heat, and ozone, because the water-based ink contains the dye represented by the general formula (1). The water-based ink further contains the cationic polymer, and hence the optical density (OD value) is suppressed from being lowered in the high humidity environment. In particular, when the glossy paper is used as the recording medium, it is estimated that the filling effect is exerted by the interaction between the cationic polymer and the silica particles on the glossy paper, the change of the easiness of diffusion (migration) of the dye on the glossy paper, which is caused depending on the humidity, is suppressed, and the decrease in the optical density (OD value) is consequently suppressed. However, the present teaching is not limited to this estimation.

[Ink Cartridge]

In the present teaching, the water-based ink set for ink jetrecording can be also provided as an ink cartridge. For example, the ink cartridge of the present teaching has a first water-based ink accommodating section and a second water-based ink accommodating section. The first water-based ink of the present teaching is accommodated in the first water-based ink accommodating section, and the second water-based ink of the present teaching is accommodated in the second water-based ink accommodating section. The ink cartridge of the present teaching may have an accommodating section for any water-based ink other than the first water-based ink and the second water-based ink of the present teaching.

The ink cartridge of the present teaching may be an ink cartridge assembly wherein the first water-based ink cartridge and the second water-based ink cartridge, which are formed individually and independently from each other, are assembled. Alternatively, the ink cartridge of the present teaching may be an integrated type ink cartridge wherein the interior thereof is comparted so that the first water-based ink accommodating section and the second water-based ink accommodating section are formed. For example, any conventionally known main body can be used for the main body of the ink cartridge of the present teaching.

[Ink-jet Recording Apparatus]

Next, an explanation will be made about an ink-jet recording apparatus of the present teaching. The recording includes, for example, the printing of letters, the printing of images, and the printing.

The ink-jet recording apparatus of the present teaching resides in an ink-jet recording apparatus including an ink accommodating section and an ink discharge mechanism for discharging an ink accommodated in the ink accommodating section, wherein the two or more types of water-based inks, which constitute the water-based ink set of the present teaching, are accommodated in the ink accommodating section.

FIG. 1 shows an exemplary arrangement of the ink-jet recording apparatus of the present teaching. As shown in the drawing, the ink-jet recording apparatus 1 includes, as main constitutive elements, four ink cartridges 2, an ink discharge mechanism (ink-jet head) 3, a head unit 4, a carriage 5, a driving unit 6, a platen roller 7, and a purge unit 8.

Each of the four ink cartridges 2 includes each of the four color water-based inks of yellow, magenta, cyan, and black one by one. For example, the water-based magenta ink is the first water-based ink of the present teaching, and one of the other water-based inks is the second water-based ink of the present teaching. General water-based inks may be used for the water-based inks other than the above. The ink-jet head 3, which is installed on the head unit 4, performs the recording on a recording medium P (for example, recording paper (preferably glossy paper, more preferably glossy paper having a void type ink absorbing layer)). The four ink cartridges 2 and the head unit 4 are carried on the carriage 5. The driving unit 6 reciprocatively moves the carriage 5 in the linear direction. For example, a conventionally known driving unit can be used as the driving unit 6 (see, for example, Japanese Patent Application Laid-open No. 2008-246821). The platen roller 7 extends in the reciprocating direction of the carriage 5, and the platen roller 7 is arranged opposingly to the ink-jet head 3.

The purge unit 8 sucks any defective ink containing the bubble or the like staying at the inside of the ink-jet head 3. For example, a conventionally known purge unit can be used as the purge unit 8 (see, for example, Japanese Patent Application Laid-open No. 2008-246821).

A wiper member 20 is arranged adjacently to the purge unit 8 on the platen roller 7 side of the purge unit 8. The wiper member 20 is formed to have a spatula-shaped form. The wiper member 20 wipes out the nozzle-formed surface of the ink-jet head 3 in accordance with the movement of the carriage 5. With reference to FIG. 1, the cap 18 covers a plurality of nozzles of the ink-jet head 3 which is returned to the reset position when the recording is completed in order to prevent the water-based inks from being dried.

In the ink jetrecording apparatus 1 of this embodiment, the four ink cartridges 2 are carried on one carriage 5 together with the head unit 4. However, the present teaching is not limited thereto. In the ink jetrecording apparatus described above, the respective cartridges of the four ink cartridges 2 may be carried on any carriage distinctly from the head unit 4. The respective cartridges of the four ink cartridges 2 may be arranged and fixed in the ink-jet recording apparatus without being carried on the carriage 5. In the modes as described above, for example, the respective cartridges of the four ink cartridges 2 are connected to the head unit 4 carried on the carriage 5 by tubes or the like, and the water-based inks are supplied from the respective cartridges of the four ink cartridges 2 to the head unit 4.

The apparatus shown in FIG. 1 adopts the serial type ink-jet head. However, the present teaching is not limited thereto. The ink-jet recording apparatus may be an apparatus which adopts a line type ink-jet head.

[Ink-jet Recording Method Using Ink Set of Present Teaching]

The ink-jet recording, which uses the ink-jet recording apparatus 1, is carried out, for example, as follows. At first, the second water-based ink of the present teaching is discharged onto the recording paper P from the ink jethead 3.

Subsequently, the first water-based ink is discharged to the discharged portion of the second water-based ink on the recording paper P. The time, which ranges from the discharge of the second water-based ink to the discharge of the first water-based ink, is not specifically limited. For example, it is appropriate that the discharge of the first water-based ink is carried out within the same scanning as that for the discharge of the second water-based ink. The second water-based ink and the first water-based ink are brought in contact with each other on the recording paper P, and thus it is possible to obtain a recorded matter which has the satisfactory hue, which is excellent in the durability or stoutness against light, heat, an ozone, and which is suppressed from the color change of the secondary color on the recording medium in the high humidity environment. The recording paper P after the recording is discharged from the ink-jet recording apparatus 1.

As in this embodiment, it is preferable that the first water-based ink, which contains the dye represented by the general formula (1), is discharged after discharging the second water-based ink containing the cationic polymer. However, the present teaching is not limited thereto. In the present teaching, the second water-based ink may be discharged after formerly discharging the first water-based ink onto the recording paper P. Alternatively, the discharge of the second water-based ink and the discharge of the first water-based ink onto the recording paper P may be performed simultaneously.

Further, when the recording is performed by overprinting the two or more types of water-based inks for ink-jet recording on the recording medium by using the ink set of the present teaching, it is preferable that the ink-jet recording method fulfills at least one of following Condition (III) and following Condition (IV).

Condition (III): the water-based ink of the two or more types of water-based inks to be overprinted, which contains the dye represented by the general formula (1), contains the cationic polymer; and Condition (IV): the water-based ink of the two or more types of water-based inks to be overprinted, which arrives at the recording medium before or simultaneously with the water-based ink containing the dye represented by the general formula (1), contains the cationic polymer.

The term "overprint" refers to the fact that the two or more types of water-based inks for ink-jet recording are discharged to the same portion on the recording medium. The two or more types of water-based inks, which are overprinted, may be discharged so that they successively arrive at (land on) the recording medium. Alternatively, the two or more types of water-based inks may be discharged so that they simultaneously arrive at (land on) the recording medium.

As described above, the phenomenon called "migration", in which the colorant blurs to the circumferential edge of the recorded portion, is caused especially easily in the high humidity environment. Therefore, in the high humidity environment, the recorded portion appears as if the opposite color of the water-based ink having the large migration level is thickened. For example, when the process black (also referred to as "tri-color black" or "composite black") is recorded by using the three color water-based inks of the water-based yellow ink, the water-based magenta ink, and the water-based cyan ink, if the migration level of the magenta ink is larger than those of the other two color water-based inks in the high humidity environment, then the green color, which is the opposite color of the magenta color, is strengthened on the recorded portion of the process black, and the recorded portion appears to be greenish black.

In the ink jetrecording method of the present teaching, the color change of the recorded portion of the secondary color is suppressed in the high humidity environment, because Condition (III) or Condition (IV) described above is fulfilled. The reason thereof is estimated as follows. The water-based ink containing the cationic polymer and the water-based ink containing the dye represented by the general formula (1) are brought in contact with each other on the recording paper P, and thus it is possible to obtain a recorded matter in which the color change of the secondary color is suppressed in the high humidity environment. In particular, when the glossy paper is used as the recording medium, it is estimated that the filling effect is exerted by the interaction between the cationic polymer and the silica particles on the glossy paper, the change of the easiness of diffusion (migration) of the dye represented by the general formula (1) on the glossy paper, which is caused depending on the humidity, is suppressed, and the color change of the recorded portion of the secondary color is consequently suppressed. However, the present teaching is not limited to this estimation.

As explained above, in the ink-jet recording method of the present teaching, it is estimated that the cationic polymer suppresses the migration of the water-based ink containing the dye represented by the general formula (1), and it is possible to obtain the recorded matter in which the color change of the secondary color is suppressed. Next, the migration level of the water-based ink used in the ink-jet recording is defined, and the ink jetrecording method explained above is generalized for the case in which any water-based ink other than the ink set of the present teaching is used. The ink jet recording method will be explained below.

[Ink-Jet Recording Method]

The ink-jet recording method of the present teaching includes preparing the two or more types of water-based inks each containing a colorant, water, and a water-soluble organic solvent; and overprinting the two or more types of water-based inks so that at least one of following Condition (V) and following Condition (VI) is fulfilled:

Condition (V): the water-based ink of the two or more types of water-based inks to be overprinted, which has a maximum migration level, contains a cationic polymer; and Condition (VI): the water-based ink of the two or more types of water-based inks to be overprinted, which arrives at the recording medium before or simultaneously with the water-based ink having the maximum migration level, contains the cationic polymer.

In the ink jetrecording method of the present teaching, the color change of the recorded portion of the secondary color is suppressed in the high humidity environment even in the case of such a combination that the water-based inks, in which the difference in the migration level therebetween is relatively large, are combined with each other.

Figure 2:
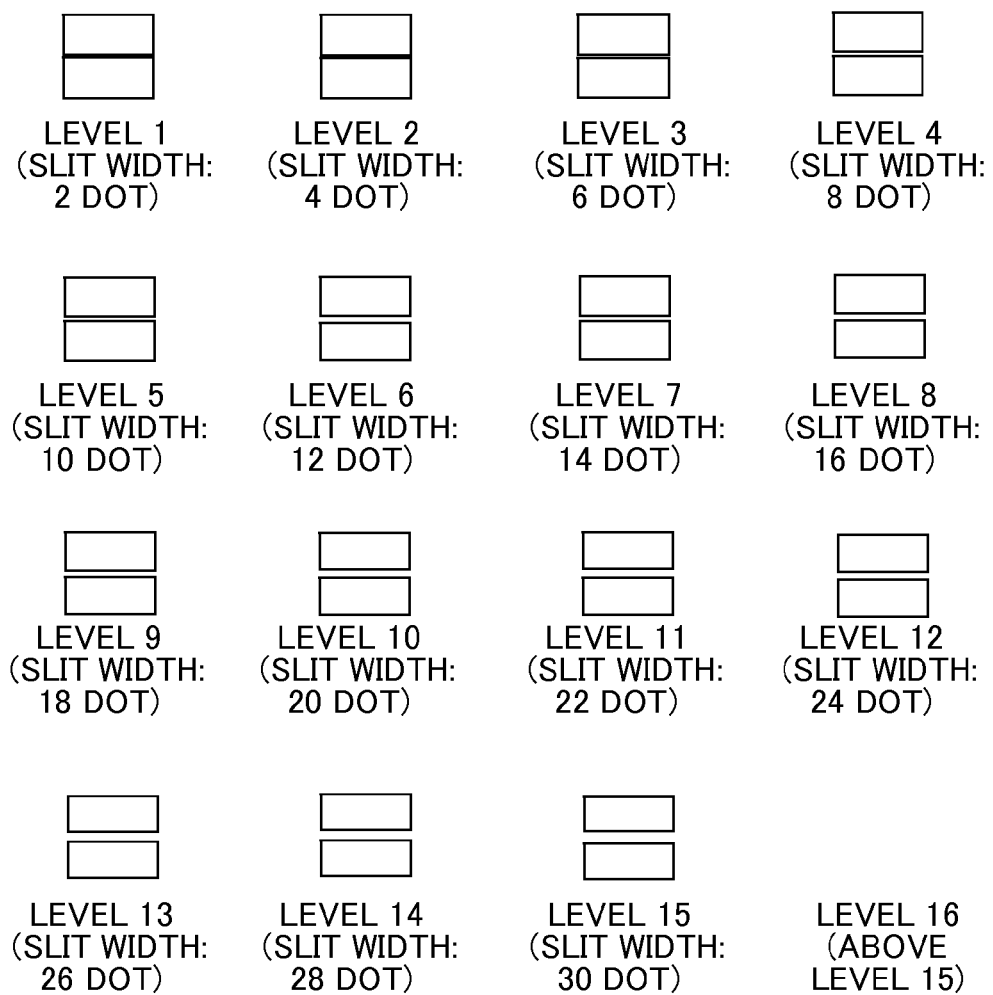
FIG. 2 illustrates a method for measuring the migration level of the water-based ink for ink-jet recording according to the present teaching.

In the present teaching, the term "migration level" is the index to indicate the easiness of the diffusion of the water-based ink, for example, on the recording medium. The "migration level" can be measured, for example, as follows. That is, at first, fifteen patches are recorded by discharging the water-based ink onto the recording medium (for example, glossy paper as described later on) as shown in FIG. 2 in a low temperature and high humidity environment (temperature: 18° C., relative humidity: 80%) to prepare an evaluation sample. Each of the fifteen patches has a slit (non-recorded portion) provided in the direction of movement of the carriage of the ink jetrecording apparatus shown in FIG. 1 described above so that a solid image (300% duty at a resolution of 1200 dpi×2400 dpi) is divided into two. When the water-based ink contains the cationic polymer, the evaluation sample is prepared by using a water-based ink from which the cationic polymer is excluded or removed. The solid image of 300% duty can be recorded, for example, such that the three ink cartridges (ink cartridges for the water-based yellow ink, the water-based magenta ink, and the water-based cyan ink) of the four ink cartridges of the ink jetrecording apparatus shown in FIG. 1 described above are replaced with the ink cartridges which are filled with an identical water-based ink, and the identical water-based ink, with which the three ink cartridges are filled, is discharged in the same scanning under a condition in which 100% duty is provided respectively. In the fifteen patches, the widths of the slits are 2, 4, 6, 8, 10, 12, 14, 16, 18, 20, 22, 24, 26, 28, and 30 dots respectively. In this case, one dot is provided at a resolution of 1200 dpi×1200 dpi, which corresponds to 1/1200 inch (2.54/1200 cm). Subsequently, the evaluation sample is stored for 3 days in the low temperature and high humidity environment. Subsequently, it is measured whether or not the slit is judged to be a white background line by using, for example, a handy type image evaluation system "PIAS (trade name)-II" produced by Quality Engineering Associates (QEA). Specifically, the slit is arranged at the center of a screen of the image evaluation system. If the slit is judged to be a continuous white background line from the left end to the right end of the screen under the following measurement condition, it is assumed that the evaluation sample is acceptable (succeeds in the examination). The judgment is progressively performed as starting from the patches having the narrow slit widths to determine the slit width at which the evaluation sample becomes acceptable (succeeds in the examination). According to the slit width, the migration level of the water-based ink is determined in accordance with the following evaluation criteria. The recording includes, for example, the printing of letters, the printing of images, and the printing.

<Measurement Condition for Migration Level>

Measurement tool: "Line analysis" or "Edge analysis";

Edge boundary line threshold value: 85%;

(the slit is judged not to be a continuous white background line if a portion, in which $\{R/(R_{max}-R_{min})\}\times 100 \leq 85$ holds, exists in the screen of the image evaluation system, assuming that $R_{max}$ represents the maximum value of the reflectance measured value for the slit portion, $R_{min}$ represents the minimum value of the reflectance measured value for the solid recorded portion of the patch, and R represents the reflectance measured value for the slit portion);

Color Plane: Auto;

Orientation: horizontal line;

Background (Polarity): dark (Light on dark).

<Evaluation Criteria for Migration Level>

Level 1: firstly acceptable at patch having slit width of 2 dots;

Level 2: firstly acceptable at patch having slit width of 4 dots;

Level 3: firstly acceptable at patch having slit width of 6 dots;

Level 4: firstly acceptable at patch having slit width of 8 dots;

Level 5: firstly acceptable at patch having slit width of 10 dots;

Level 6: firstly acceptable at patch having slit width of 12 dots;

Level 7: firstly acceptable at patch having slit width of 14 dots;

Level 8: firstly acceptable at patch having slit width of 16 dots;

Level 9: firstly acceptable at patch having slit width of 18 dots;

Level 10: firstly acceptable at patch having slit width of 20 dots;

Level 11: firstly acceptable at patch having slit width of 22 dots;

Level 12: firstly acceptable at patch having slit width of 24 dots;

Level 13: firstly acceptable at patch having slit width of 26 dots;

Level 14: firstly acceptable at patch having slit width of 28 dots;

Level 15: firstly acceptable at patch having slit width of 30 dots;

Level 16: not acceptable even in case of patch having slit width of 30 dots.

Next, the ink jet recording method of the present teaching will be explained in detail as exemplified by examples. However, the present teaching is not restricted and limited to the following explanation.

In the ink-jet recording method of the present teaching, at first, the two or more types of water-based inks are prepared. The water-based ink contains the colorant, water, and the water-soluble organic solvent. The colorant may be either the dye or the pigment. The dye and the pigment may be used in a mixed manner as the colorant.

The dye is not specifically limited. It is possible to use, for example, the dye represented by the general formula (1) to be used for the first ink of the water-based ink set for ink-jet recording as explained above and the various dyes explained in the second ink. Other than these dyes, for example, compounds, which are represented by chemical formulas (M1a) to (M1b) and chemical formulas (M2a) to (M2e), can be also preferably used as the dye.

(M1a)
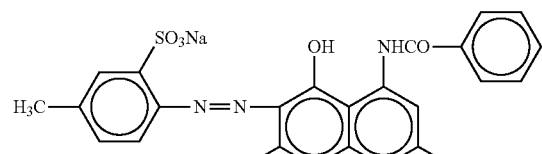

(M1b)
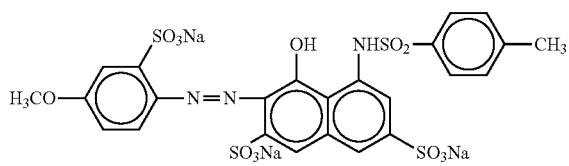

(M2a)
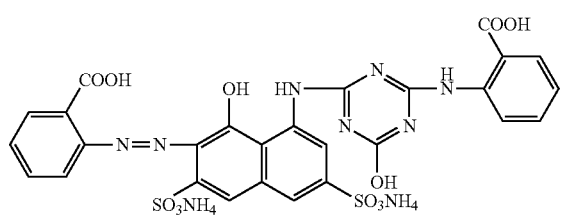

(M2b)
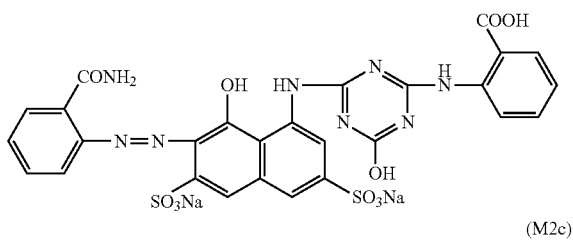

(M2c)
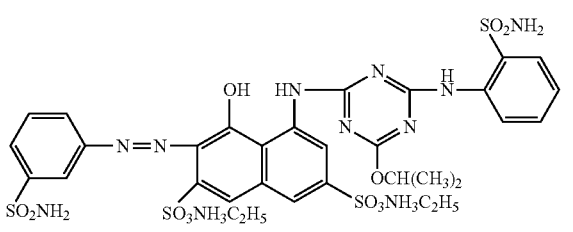

(M2d)
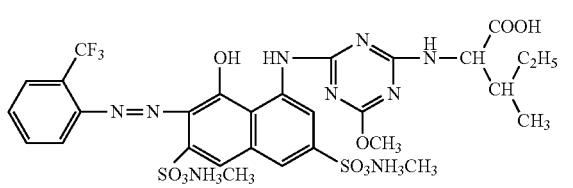

(M2e)
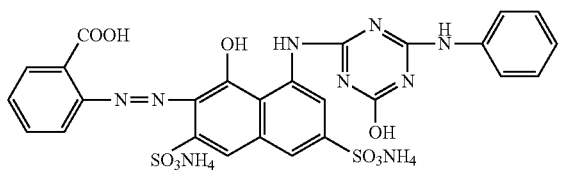

The blending amount of the dye with respect to the total amount of the water-based ink is not specifically limited, which is, for example, 0.1% by weight to 10% by weight, preferably 0.5% by weight to 8% by weight, and more preferably 1% by weight to 6% by weight.

The pigment is not specifically limited, for which it is possible to use, for example, carbon black, inorganic pigments, and organic pigments. When the pigment is used, it is preferable to use a dispersant.

The blending amount of the solid content of the pigment with respect to the total amount of the water-based ink (pigment solid content amount) is not specifically limited, which can be appropriately determined depending on, for example, the desired optical density and the coloration or colorfulness. The pigment solid content amount is, for example, 0.1% by weight to 20% by weight, preferably 1% by weight to 10% by weight, and more preferably 2% by weight to 8% by weight.

One type of the colorant as described above may be used singly, or two or more types of the colorants as described above may be used in combination.

It is preferable that the water is ion exchange water or pure water. The blending amount of water (water ratio) with respect to the total amount of the water-based ink is, for example, 10% by weight to 90% by weight, and preferably 40% by weight to 80% by weight. The water ratio may be, for example, the balance of the other components.

As for the water-soluble organic solvent, it is possible to use the same or equivalent water-soluble organic solvent as that used for the first ink of the ink set for ink-jet recording explained above.

The water-based ink may further contain the same or equivalent additive as that contained in the first water-based ink, if necessary.

The water-based ink can be prepared, for example, such that the colorant, water, the water-soluble organic solvent, and optionally other additive components are mixed uniformly or homogeneously by any conventionally known method, and undissolved matters are removed by a filter or the like.

The ink-jet recording method of the present teaching can be carried out by using, for example, the ink-jet recording apparatus shown in FIG. 1.

Next, an explanation will be made about an embodiment of the ink jetrecording method of the present teaching as exemplified by an exemplary case in which the ink-jet recording apparatus shown in FIG. 1 is used. However, the following embodiment is provided merely by way of example, and the present teaching is not limited thereto.

<Third Embodiment>

This embodiment resides in such a mode that the water-based ink of the two or more types of water-based inks to be overprinted, which has the maximum migration level, contains the cationic polymer, i.e., Condition (V) described above is fulfilled.

At first, the water-based inks other than the water-based ink having the maximum migration level, which are included in the two or more types of water-based inks to be overprinted on the recording paper P, are discharged from the ink-jet head 3.

Subsequently, the water-based ink having the maximum migration level is discharged to the discharged portion of the water-based inks other than the water-based ink having the maximum migration level, from the ink-jet head 3. It is preferable that the maximum value of the migration level is less than 10. In this embodiment, the water-based ink, which has the maximum migration level, contains the cationic polymer. When the water-based ink, which has the maximum migration level, is allowed to contain the cationic polymer, it is estimated that the color change of the recorded portion of the secondary color is suppressed in the high humidity environment. In particular, when the glossy paper is used as the recording medium, it is estimated that the filling effect is exerted by the interaction between the cationic polymer and the silica particles on the glossy paper, the change of the easiness of diffusion (migration) of the dye on the glossy paper, which is caused depending on the humidity, is suppressed, and the color change of the secondary color on the recorded portion is consequently suppressed. However, the present teaching is not limited to this estimation.

It is preferable that the cationic polymer is at least one compound of the compound represented by the general formula (2), the compound represented by the general formula (3), the compound represented by the general formula (4), and the compound represented by the general formula (5) (polyethyleneimine) As for the cationic polymer, it is possible to use the cationic polymer which is the same as or equivalent to that used for the second ink of the ink set for ink-jet recording explained above.

The time, which ranges from the discharge of the water-based ink other than the water-based ink having the maximum migration level to the discharge of the water-based ink having the maximum migration level, is not specifically limited. For example, it is appropriate that the discharge of the water-based ink having the maximum migration level is carried out within the same scanning as that for the discharge of the water-based ink other than the water-based ink having the maximum migration level. The water-based ink having the maximum migration level contains the cationic polymer, and thus it is possible to obtain a recorded matter in which the color change of the secondary color is suppressed in the high humidity environment. The recording paper P after the recording is discharged from the ink jetrecording apparatus 1.

In this embodiment, the water-based ink having the maximum migration level is discharged after discharging the water-based ink other than the water-based ink having the maximum migration level onto the recording paper P. However, in this embodiment, it is also allowable that the water-based ink other than the water-based ink having the maximum migration level is discharged after formerly discharging the water-based ink having the maximum migration level onto the recording paper P. It is also allowable to simultaneously perform the discharge of the water-based ink other than the water-based ink having the maximum migration level and the discharge of the water-based ink having the maximum migration level onto the recording paper P.

<Fourth Embodiment>

This embodiment resides in such a mode that the water-based ink of the two or more types of water-based inks to be overprinted, which arrives at (lands on) the recording paper P before or simultaneously with the water-based ink having the maximum migration level, contains the cationic polymer, i.e., Condition (VI) described above is fulfilled. An ink jetrecording method of this embodiment can be carried out in the same manner as the ink-jet recording method of the third embodiment except that the water-based ink of the two or more types of water-based inks to be overprinted, which arrives at (lands on) the recording paper P before or simultaneously with the water-based ink having the maximum migration level, is allowed to contain the cationic polymer. The water-based ink containing the cationic polymer and the water-based ink having the maximum migration level are brought in contact with each other on the recording paper P, and thus it is possible to obtain a recorded matter in which the color change of the secondary color is suppressed in the high humidity environment.

As for the water-based ink allowed to contain the cationic polymer, for example, the migration levels are measured for the two or more types of water-based inks to be overprinted. Considering the result of the measurement and the order or sequence of the respective water-based inks to be discharged, the water-based ink, which arrives at (lands on) the recording paper P before or simultaneously with the water-based ink having the maximum migration level, is selected.

EXAMPLES

Next, Examples of the present teaching will be explained together with Comparative Examples. It is noted that the present teaching is not limited and restricted to Examples and Comparative Examples described below.

Examples 1 to 12 and Comparative Examples 1 to 4

(a) Preparation of Water-Based Yellow Ink

Respective components of a water-based yellow ink composition (Table 1) were mixed uniformly. After that, an obtained mixture was filtrated by using a hydrophilic polytetrafluoroethylene (PTFE) type membrane filter (pore size: 0.20 μm) produced by Toyo Roshi Kaisha, Ltd. Accordingly, water-based yellow inks for ink jetrecording Y1 to Y13 were obtained. In Table 1, dyes (Ya) to (Ye) are compounds which are represented by following chemical formulas (Ya) to (Ye) respectively. In the chemical formulas (Ya) to (Ye), —$C_4H_9(t)$ represents tert-butyl group.

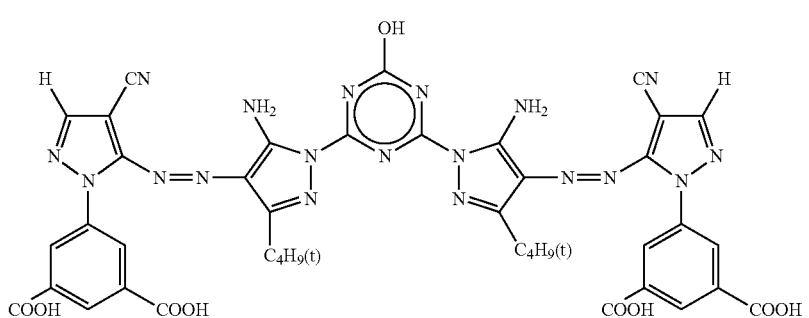
(Ya)
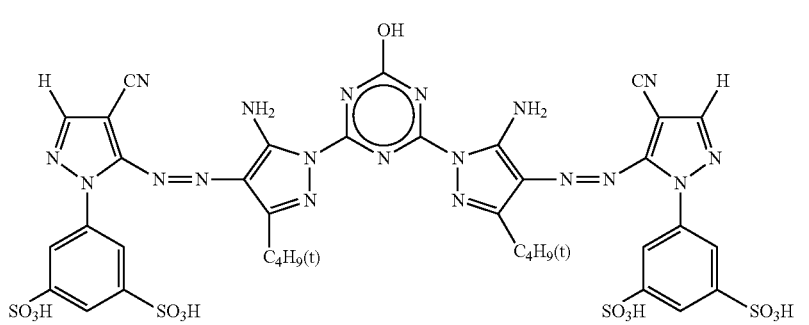
(Yb)
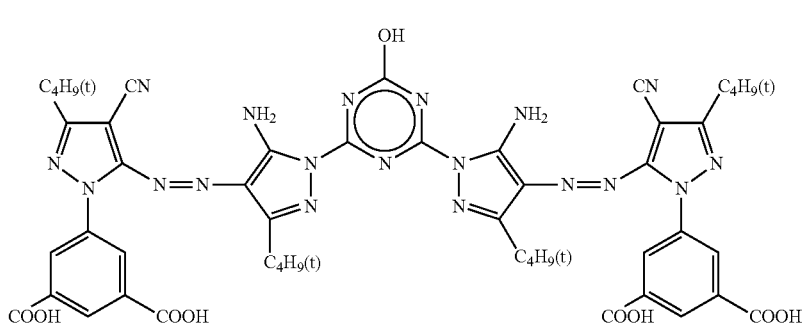
(Yc)
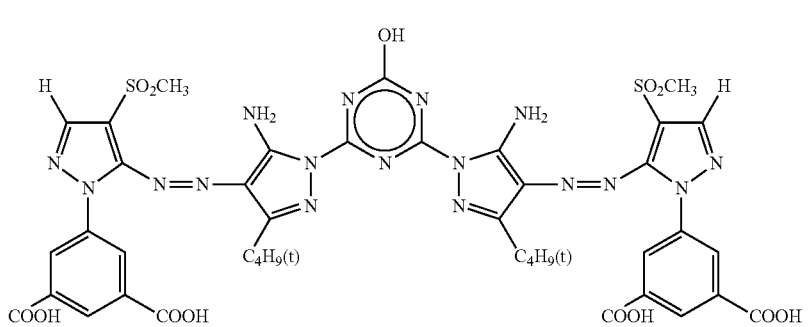
(Yd)

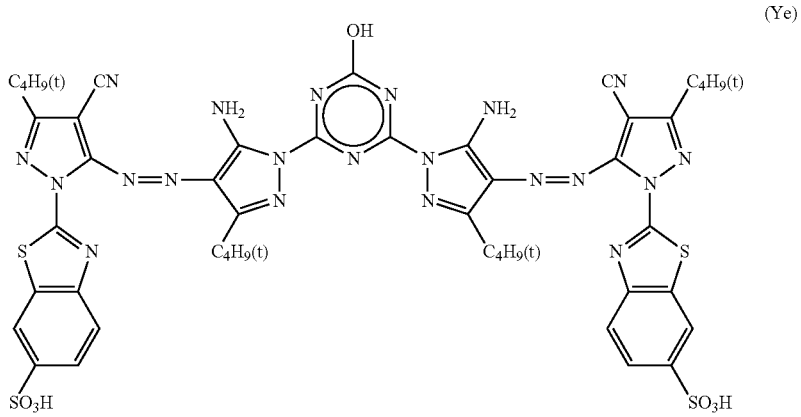

(b) Preparation of Water-Based Magenta Ink

Respective components of a water-based magenta ink composition (Table 2) were mixed uniformly. After that, an obtained mixture was filtrated by using a hydrophilic polytetrafluoroethylene (PTFE) type membrane filter (pore size: 0.20 μm) produced by Toyo Roshi Kaisha, Ltd. Accordingly, water-based magenta inks for ink-jet recording M1 to M5 were obtained. In Table 2, dyes (1-A) to (1-E) are compounds which are represented by chemical formulas (1-A) to (1-E) respectively.

(c) Preparation of Water-Based Cyan Ink

Respective components of a water-based cyan ink composition (Table 3) were mixed uniformly. After that, an obtained mixture was filtrated by using a hydrophilic polytetrafluoroethylene (PTFE) type membrane filter (pore size: 0.20 μm) produced by Toyo Roshi Kaisha, Ltd. Accordingly, water-based cyan inks for ink-jet recording C1 to C5 were obtained. In Table 3, dyes (Ca) to (Ce) are compounds which are represented by chemical formulas (Ca) to (Ce) respectively. In the chemical formulas (Ca) to (Ce), Pc(Cu) is the copper phthalocyanine nucleus represented by the general formula (Pc). In the chemical formulas (Ca) to (Ce), Pc(Cu) is the copper phthalocyanine nucleus represented by the general formula (Pc), and $R_{21}$, $R_{22}$, $R_{23}$ respectively exist in the four benzene rings A, B, C, and D in the copper phthalocyanine nucleus represented by the general formula (Pc).

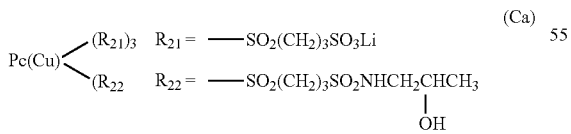

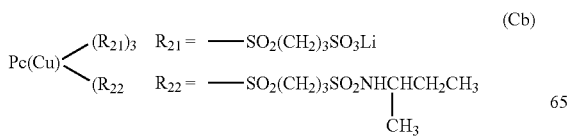

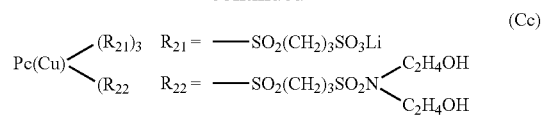

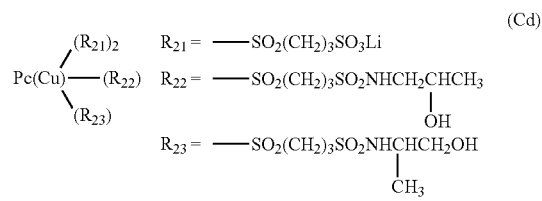

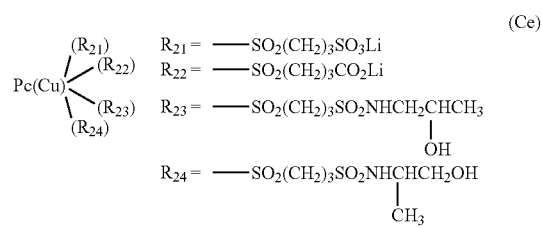

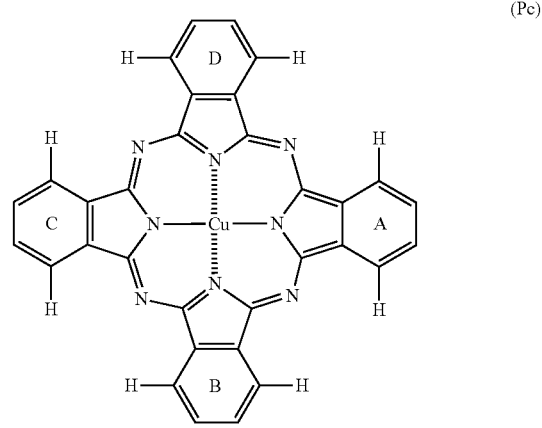

TABLE 1

|  |  | Y1 | Y2 | Y3 | Y4 | Y5 | Y6 | Y7 |
|---|---|---|---|---|---|---|---|---|
| Water-based Yellow Ink Composition (% by weight) | Dye (Ya) | 2.70 | — | 2.70 | 2.70 | 2.70 | 2.70 | — |
|  | Dye (Yb) | — | — | — | — | — | — | 2.70 |
|  | Dye (Yc) | — | — | — | — | — | — | — |
|  | Dye (Yd) | — | 2.70 | — | — | — | — | — |
|  | Dye (Ye) | — | — | — | — | — | — | — |
|  | Glycerol (*1) | 23.5 | 26.0 | 23.5 | 25.0 | 25.5 | 25.8 | 23.5 |
|  | Diethylene glycol | 3.00 | 3.00 | 3.00 | 3.00 | 3.00 | 3.00 | 3.00 |
|  | Dipropylene glycol monopropyl ether | 2.00 | 2.00 | 2.00 | 2.00 | 2.00 | 2.00 | 2.00 |
|  | Olfine (trade name) E1010(*2) | 0.20 | 0.20 | 0.20 | 0.20 | 0.20 | 0.20 | 0.20 |
|  | Polylysine (*3) | 2.5 | — | — | — | — | — | — |
|  | PAA (trade name)-3 (*4) | — | — | 2.5 | 1 | 0.5 | 0.2 | — |
|  | Polyethyleneimine 1800 (*5) | — | — | — | — | — | — | 2.5 |
|  | Polyethyleneimine 1200 (*6) | — | — | — | — | — | — | — |
|  | Polyethyleneimine 600(*7) | — | — | — | — | — | — | — |
|  | Kollidon 12PF (*8) | — | — | — | — | — | — | — |
|  | Lysine hydrochloride (*9) | — | — | — | — | — | — | — |
|  | Dimethyl ethyloctyl ammonium ethylsulfate | — | — | — | — | — | — | — |
|  | Water | balance | balance | balance | balance | balance | balance | balance |

|  |  | Y8 | Y9 | Y10 | Y11 | Y12 | Y13 |
|---|---|---|---|---|---|---|---|
| Water-based Yellow Ink Composition (% by weight) | Dye (Ya) | — | — | — | — | — | — |
|  | Dye (Yb) | — | — | — | — | — | — |
|  | Dye (Yc) | 2.70 | 2.70 | — | 2.70 | — | — |
|  | Dye (Yd) | — | — | — | — | 2.70 | — |
|  | Dye (Ye) | — | — | 2.70 | — | — | 2.70 |
|  | Glycerol (*1) | 23.5 | 25.0 | 23.5 | 23.5 | 23.5 | 23.5 |
|  | Diethylene glycol | 3.00 | 3.00 | 3.00 | 3.00 | 3.00 | 3.00 |
|  | Dipropylene glycol monopropyl ether | 2.00 | 2.00 | 2.00 | 2.00 | 2.00 | 2.00 |
|  | Olfine (trade name) E1010 (*2) | 0.20 | 0.20 | 0.20 | 0.20 | 0.20 | 0.20 |
|  | Polylysine (*3) | — | — | — | — | — | — |
|  | PAA (trade name)-3 (*4) | — | — | — | — | — | — |
|  | Polyethyleneimine 1800 (*5) | — | — | — | — | — | — |
|  | Polyethyleneimine 1200 (*6) | 2.5 | 1 | — | — | — | — |
|  | Polyethyleneimine 600 (*7) | — | — | 2.5 | — | — | — |
|  | Kollidon 12PF (*8) | — | — | — | 2.5 | — | — |
|  | Lysine hydrochloride (*9) | — | — | — | — | 2.5 | — |
|  | Dimethyl ethyloctyl ammonium ethylsulfate | — | — | — | — | — | 2.5 |
|  | Water | balance | balance | balance | balance | balance | balance |

(*1): Produced by Kao Corporation, numerical values in table indicate active ingredient amounts.
(*2): Ethylene oxide (10 mole) adduct of acetylene diol, produced by Nissin Chemical Industry Co., Ltd.
(*3): Produced by Chisso Corporation (weight average molecular weight: 4000), numerical values in table indicate active ingredient amounts.
(*4): Unneutralized product of polyallylamine (weight average molecular weight: 3000), produced by Nitto Boseki Co., Ltd., active ingredient amount = 20% by weight, numerical values in table indicate active ingredient amounts.
(*5): Produced by Junsei Chemical Co., Ltd. (weight average molecular weight: 1800).
(*6): Produced by Junsei Chemical Co., Ltd. (weight average molecular weight: 1200).
(*7): Produced by Junsei Chemical Co., Ltd. (weight average molecular weight: 600).
(*8): Polyvinyl pyrrolidone produced by BASF (weight average molecular weight: 2000 to 3000).
(*9): Produced by Kyowa Hakko Bio Co., Ltd.

TABLE 2

|  |  | M1 | M2 | M3 | M4 | M5 |
|---|---|---|---|---|---|---|
| Water-based Magenta Ink Composition (% by weight) | Dye (1-A) | 3.50 | — | — | — | — |
|  | Dye (1-B) | — | 3.50 | — | — | — |
|  | Dye (1-C) | — | — | 3.50 | — | — |
|  | Dye (1-D) | — | — | — | 3.50 | — |
|  | Dye (1-E) | — | — | — | — | 3.50 |
|  | Glycerol (*1) | 23.5 | 26.0 | 26.0 | 26.0 | 26.0 |
|  | Diethylene glycol | 3.00 | 3.00 | 3.00 | 3.00 | 3.00 |
|  | Dipropylene glycol monopropyl ether | 2.00 | 2.00 | 2.00 | 2.00 | 2.00 |
|  | Olfine (trade name) E1010 (*2) | 0.20 | 0.20 | 0.20 | 0.20 | 0.20 |
|  | Polylysine (*3) | 2.50 | — | — | — | — |
|  | Water | balance | balance | balance | balance | balance |

(*1): Produced by Kao Corporation, numerical values in table indicate active ingredient amounts.
(*2): Ethylene oxide (10 mole) adduct of acetylene diol, produced by Nissin Chemical Industry Co., Ltd.
(*3): Produced by Chisso Corporation (weight average molecular weight: 4000), numerical values in table indicate active ingredient amounts.

TABLE 3

|  |  | C1 | C2 | C3 | C4 | C5 |
|---|---|---|---|---|---|---|
| Water-based Cyan Ink Composition (% by weight) | Dye (Ca) | 3.50 | — | — | — | — |
|  | Dye (Cb) | — | 3.50 | — | — | — |
|  | Dye (Cc) | — | — | 3.50 | — | — |
|  | Dye (Cd) | — | — | — | 3.50 | — |
|  | Dye (Ce) | — | — | — | — | 3.50 |
|  | Glycerol (*1) | 23.5 | 26.0 | 26.0 | 26.0 | 26.0 |
|  | Diethylene glycol | 3.00 | 3.00 | 3.00 | 3.00 | 3.00 |
|  | Dipropylene glycol monopropyl ether | 2.00 | 2.00 | 2.00 | 2.00 | 2.00 |
|  | Olfine (trade name) E1010 (*2) | 0.20 | 0.20 | 0.20 | 0.20 | 0.20 |
|  | Polylysine (*3) | 2.50 | — | — | — | — |
|  | Water | balance | balance | balance | balance | balance |

(*1): Produced by Kao Corporation, numerical values in table indicate active ingredient amounts.
(*2): Ethylene oxide (10 mole) adduct of acetylene diol, produced by Nissin Chemical Industry Co., Ltd.
(*3): Produced by Chisso Corporation (weight average molecular weight: 4000), numerical values in table indicate active ingredient amounts.

(d) Construction of Water-based Ink Set for Ink-Jet Recording

Water-based ink sets for ink jetrecording of Examples 1 to 12 and Comparative Examples 1 to 14 were constructed by combining the water-based yellow ink, the water-based magenta ink, and the water-based cyan ink as shown in Tables 4 and 5.

(e) Evaluation of Water-based Ink Set for Ink-Jet Recording

The chromaticness (C*) difference (ΔC*) evaluation was performed in accordance with the following method for the water-based ink sets of Examples and Comparative Examples. An ink jet printer-equipped digital multifunction machine DCP-385C produced by Brother Industries, Ltd. was used to record a tri-color black patch on "Exclusive paper (photograph glossy paper) (BP-71)" (Glossy paper A) produced by Brother Industries, Ltd. by using the three color water-based inks (water-based yellow ink: water-based magenta ink: water-based cyan ink (volume ratio)=1:1:1) for constructing each of the water-based ink sets of Examples and Comparative Examples. The chromaticness (C*) difference (ΔC*) was calculated for the tri-color black patch in accordance with the following method. Tri-color black patches were recorded on "Photograph paper Crispia <Highly Glossy>" (Glossy paper B) and "Photograph paper <Glossy>" (Glossy paper C) produced by Seiko Epson Corp. in Example 1 and Comparative Example 1, on Glossy paper B in Comparative Example 2, and on Glossy paper C in Comparative Example 3, and the chromaticness (C*) difference (AC*) was calculated in the same manner as described above.

The tri-color black patch was recorded in an environment at the ordinary temperature and the ordinary humidity (temperature: 25° C., relative humidity: 50%), which was stored for 24 hours in the same environment as that provided during the recording to obtain an ordinary temperature-ordinary humidity environment sample. Further, the tri-color black patch was recorded in an environment at a low temperature and a high humidity (temperature: 18° C., relative humidity: 80%), which was stored for 24 hours in the same environment as that provided during the recording to obtain a low temperature-high humidity environment sample. The a* value and the b* value of the ordinary temperature-ordinary humidity environment sample and the low temperature-high humidity environment sample were measured by using a spectrophotometer Spectrolino produced by Gretag Macbeth (measuring field: 2°, white reference: Abs (absolute white), light source: $D_{50}$, density reference: ANSI T). The chromaticness (C*) difference (ΔC*) was calculated between the two environments of the ordinary temperature-ordinary humidity and the low temperature-high humidity in accordance with the following expression. The chromaticness (C*) difference (ΔC*) was evaluated in accordance with the following evaluation criteria.

$$\Delta C^* = \{(a_1^* - a_2^*)^2 + (b_1^* - b_2^*)^2\}^{1/2}$$

$a_1^*$: a* value of tri-color black patch of low temperature-high humidity environment sample;
$a_2^*$: a* value of tri-color black patch of ordinary temperature-ordinary humidity environment sample;
$b_1^*$: b* value of tri-color black patch of low temperature-high humidity environment sample;
$b_2^*$: b* value of tri-color black patch of ordinary temperature-ordinary humidity environment sample.

<Evaluation Criteria for Chromaticness (C*) Difference (AC*) Evaluation>
A: chromaticness (C*) difference (AC*) is less than 2.5;
B: chromaticness (C*) difference (AC*) is not less than 2.5 and less than 5;
C: chromaticness (C*) difference (AC*) is not less than 5.

The construction and the evaluation results of the water-based ink sets of Examples are shown in Table 4. The construction and the evaluation results of the water-based ink sets of Comparative Examples are shown in Table 5.

TABLE 4

|  |  |  | Example | | | | |
|---|---|---|---|---|---|---|---|
|  |  |  | 1 | 2 | 3 | 4 | 5 |
| Water-based Ink Set | Water-based yellow ink | | Y1 | Y3 | Y7 | Y4 | Y5 |
|  | cationic type polymer | | polylysine | PAA (trade name)-3 | Poly-ethylene-imine 1800 | PAA (trade name)-3 | PAA (trade name)-3 |
|  | blending amount | |  | 2.5 | 2.5 | 2.5 | 1 | 0.5 |
|  | Water-based cyan ink | C2 | C4 | C5 | C3 | C4 | C3 | C3 |

TABLE 4-continued

|  |  |  |  |  |  |  |  |
|---|---|---|---|---|---|---|---|
| cationic type | — | — | — | — | — | — | — |
| polymer blending amount | — | — | — | — | — | — | — |
| Water-based magenta ink | M2 | M4 | M5 | M3 | M4 | M3 | M3 |
| cationic type | — | — | — | — | — | — | — |
| polymer blending amount | — | — | — | — | — | — | — |
| Glossy paper | A | B | C | A | A | A | A |
| Chromaticness (C*) difference (ΔC*) evaluation | A | A | A | A | A | A | A |

|  |  | Example |  |  |  |  |  |  |
|---|---|---|---|---|---|---|---|---|
|  |  | 6 | 7 | 8 | 9 | 10 | 11 | 12 |
| Water-based Ink Set | Water-based yellow ink | Y6 | Y8 | Y9 | Y10 | Y2 | Y2 | Y1 |
|  | cationic polymer type | PAA (trade name)-3 | Poly-ethylene-imine 1200 | Poly-ethylene-imine 1200 | Poly-ethylene-imine 600 | — | — | polylysine |
|  | blending mount | 0.2 | 2.5 | 1 | 2.5 | — | — | 2.5 |
|  | Water-based cyan ink | C3 | C4 | C4 | C4 | C1 | C2 | C1 |
|  | cationic polymer type | — | — | — | — | polylysine | — | polylysine |
|  | blending amount | — | — | — | — | 2.5 | — | 2.5 |
|  | Water-based magenta ink | M3 | M4 | M4 | M4 | M2 | M1 | M1 |
|  | cationic polymer type | — | — | — | — | — | polylysine | polylysine |
|  | blending amount | — | — | — | — | — | 2.5 | 2.5 |
| Glossy paper |  | A | A | A | A | A | A | A |
| Chromaticness (C*) difference (ΔC*) evaluation |  | B | A | A | B | A | A | A |

TABLE 5

|  |  | Comparative Example |  |  |  |
|---|---|---|---|---|---|
|  |  | 1 | 2 | 3 | 4 |
| Water-based Ink Set | Water-based yellow ink | Y2 | Y11 | Y12 | Y13 |
|  | cationic polymer comparative object type | — | Kollidon 12PF | lysine hydrochloride | Dimethyl ethyl Octyl ammonium Ethyl sulfate |
|  | blending amount | — | 2.5 | 2.5 | 2.5 |
|  | Water-based cyan ink | C2 C4 C5 | C3 | C4 | C5 |
|  | cationic polymer comparative object type | — — — | — | — | — |
|  | blending amount | — — — | — | — | — |
|  | Water-based magenta ink | M2 M4 M5 | M3 | M4 | M5 |
|  | cationic polymer comparative object type | — — — | — | — | — |
|  | blending amount | — — — | — | — | — |
| Glossy paper |  | A B C | A B | A C | A |
| Chromaticness (C*) difference (ΔC*) evaluation |  | C C C | C C | C C | C |

As shown in Table 4, the change of the chromaticness (C*) of the tri-color black patch was suppressed in the low temperature-high humidity environment in Examples 1 to 12, probably for the following reason. That is, it is estimated that the ink sets of Examples 1 to 10 fulfill Condition (I) described above, Example 11 fulfills Condition (II) described above, and Example 12 fulfills both Conditions (I) and (II). Further, the change of the chromaticness (C*) of the tri-color black patch was more suppressed in the low temperature-high humidity environment in Examples 1 to 5, 7, 8, and 10 to 12 in which the cationic polymer having the weight average molecular weight of not less than 1200 was used and the blending amount of the cationic polymer with respect to the total amount of the water-based ink was not less than 0.5% by weight and not more than 2.5% by weight.

On the other hand, in Comparative Example 1 in which the water-based ink containing the cationic polymer was not used, the filling effect was not expressed, and the great change was caused in the chromaticness (C*) of the tri-color black patch in the low temperature-high humidity environment. Also in Comparative Examples 2 to 4 each of which used the water-based ink containing polyvinyl pyrrolidone as a non-cationic polymer or lysine hydrochloride or dimethyl ethyloctyl ammonium ethylsulfate as a cationic low molecular weight substance in place of the cationic polymer, the filling effect was not expressed, and the great change was caused in the chromaticness (C*) of the tri-color black patch in the low temperature-high humidity environment.

As described above, the ink set of the present teaching provides the satisfactory hue, and the ink set is excellent in the durability or stoutness against light, heat, and ozone, wherein the color change of the secondary color on the recording medium is suppressed in the high humidity environment. The way of use of the water-based ink set of the present teaching is not specifically limited, and water-based ink set is widely applicable to various types of ink-jet recording.

Examples 13 to 22 and Comparative Examples 5 to 8

(a) Preparation of Water-Based Ink

Respective components of a water-based ink composition (Table 6) were mixed uniformly. After that, an obtained mixture was filtrated by using a hydrophilic polytetrafluoroethylene (PTFE) type membrane filter (pore size: 0.20 μm) produced by Toyo Roshi Kaisha, Ltd. Accordingly, water-based inks for ink-jet recording of Examples 13 to 22 and Comparative Examples 5 to 8 were obtained. In Table 6, dyes (1-A) to (1-E) are compounds which are represented by chemical formulas (1-A) to (1-E) respectively.

(b) Evaluation of Water-based Ink

The optical density (OD value) difference (ΔOD) evaluation was performed in accordance with the following method for the water-based inks of Examples and Comparative Examples. An ink jet printer-equipped digital multifunction machine DCP-385C produced by Brother Industries, Ltd. was used to record a magenta patch on "Exclusive paper (photograph glossy paper) (BP-71)" (Glossy paper A) produced by Brother Industries, Ltd. by using the water-based inks of Examples and Comparative Examples. The optical density (OD value) difference (ΔOD) was calculated for the magenta patch in accordance with the following method. Magenta patches were also recorded on "Photograph paper Crispia <Highly Glossy>" (Glossy paper B) and "Photograph paper <Glossy>" (Glossy paper C) produced by Seiko Epson Corp. in Example 13 and Comparative Example 5, on Glossy paper B in Comparative Example 6, and on Glossy paper C in Comparative Example 7, and the optical density (OD value) difference (ΔOD) was calculated in the same manner as described above.

The magenta patch was recorded in an environment at the ordinary temperature and the ordinary humidity (temperature: 25° C., relative humidity: 50%), which was stored for 24 hours in the same environment as that provided during the recording to obtain an ordinary temperature-ordinary humidity environment sample. Further, the magenta patch was recorded in an environment at a low temperature and a high humidity (temperature: 18° C., relative humidity: 80%), which was stored for 24 hours in the same environment as that provided during the recording to obtain a low temperature-high humidity environment sample. The optical densities (OD values) of the ordinary temperature-ordinary humidity environment sample and the low temperature-high humidity environment sample were measured by using a spectrophotometer Spectrolino produced by Gretag Macbeth (contained filter: non (No), white reference: Abs (absolute white), density reference: ANSI T, density filter: automatic). The optical density (OD value) difference (ΔOD) was calculated between the two environments of the ordinary temperature-ordinary humidity and the low temperature-high humidity in accordance with the following expression. The optical density (OD value) difference (ΔOD) was evaluated in accordance with the following evaluation criteria.

$$\Delta OD = |OD_1 - OD_2|$$

$OD_1$: optical density (OD value) of magenta patch of low temperature-high humidity environment sample;
$OD_2$: optical density (OD value) of magenta patch of ordinary temperature-ordinary humidity environment sample.

<Evaluation Criteria for Optical Density (OD Value) Difference>

A: optical density (OD value) difference (ΔOD) is less than 0.08;
B: optical density (OD value) difference (ΔOD) is not less than 0.08 and less than 0.12;
C: optical density (OD value) difference (ΔOD) is not less than 0.12.

The water-based ink compositions and the evaluation results of the water-based inks of Examples and Comparative Examples are shown in Table 6.

TABLE 6

| | | Example | | | | | | |
|---|---|---|---|---|---|---|---|---|
| | | 13 | 14 | 15 | 16 | 17 | 18 | 19 |
| Water-based Ink Composition (% by weight) | Dye (1-A) | — | — | — | — | 3.50 | — | — |
| | Dye (1-B) | 3.50 | — | — | — | — | 3.50 | — |
| | Dye (1-C) | — | 3.50 | — | — | — | — | 3.50 |
| | Dye (1-D) | — | — | 3.50 | — | — | — | — |
| | Dye (1-E) | — | — | — | 3.50 | — | — | — |
| | Glycerol (*1) | 23.5 | 23.5 | 23.5 | 23.5 | 25.0 | 25.5 | 25.8 |
| | Diethylene glycol | 3.00 | 3.00 | 3.00 | 3.00 | 3.00 | 3.00 | 3.00 |
| | Dipropylene glycol monopropyl ether | 2.00 | 2.00 | 2.00 | 2.00 | 2.00 | 2.00 | 2.00 |
| | Olfine (trade name) E1010 (*2) | 0.20 | 0.20 | 0.20 | 0.20 | 0.20 | 0.20 | 0.20 |
| | Polylysine (*3) | 2.50 | — | — | — | — | — | — |
| | PAA (trade name)-3 (*4) | — | 2.50 | — | — | 1.00 | 0.50 | 0.20 |
| | Polyethyleneimine 1800 (*5) | — | — | 2.50 | — | — | — | — |
| | Polyethyleneimine 1200 (*6) | — | — | — | 2.50 | — | — | — |
| | Water | balance | balance | balance | balance | balance | balance | balance |
| | Glossy paper | A B C | A | A | A | A | A | A |
| Optical density (OD value) difference (ΔOD) evaluation | | A A A | A | A | A | A | A | B |

| | | Example | | | Comparative Example | | | |
|---|---|---|---|---|---|---|---|---|
| | | 20 | 21 | 22 | 5 | 6 | 7 | 8 |
| Water-based Ink Composition (% by weight) | Dye (1-A) | — | — | 3.50 | 3.50 | — | — | — |
| | Dye (1-B) | — | — | — | — | 3.50 | — | — |
| | Dye (1-C) | — | — | — | — | — | 3.50 | — |
| | Dye (1-D) | 3.50 | — | — | — | — | — | 3.50 |
| | Dye (1-E) | — | 3.50 | — | — | — | — | — |
| | Glycerol (*1) | 25.0 | 25.5 | 23.5 | 26.0 | 23.5 | 23.5 | 23.5 |
| | Diethylene glycol | 3.00 | 3.00 | 3.00 | 3.00 | 3.00 | 3.00 | 3.00 |
| | Dipropylene glycol monopropyl ether | 2.00 | 2.00 | 2.00 | 2.00 | 2.00 | 2.00 | 2.00 |

TABLE 6-continued

| | | | | | | | |
|---|---|---|---|---|---|---|---|
| Olfine (trade name) E1010 (*2) | 0.20 | 0.20 | 0.20 | 0.20 | 0.20 | 0.20 | 0.20 |
| Polyethyleneimine 1200 (*6) | 1.00 | 0.50 | — | — | — | — | — |
| Polyethyleneimine 600 (*7) | — | — | 2.50 | — | — | — | — |
| Kollidon 12PF (*8) | — | — | — | — | 2.50 | — | — |
| Lysine hydrochloride (*9) | — | — | — | — | — | 2.50 | — |
| Dimethyl ethyloctyl ammonium ethylsulfate | — | — | — | — | — | — | 2.50 |
| Water | balance | balance | balance | balance | balance | balance | balance |
| Glossy paper | A | A | A | A B C | A B | A C | A |
| Optical density (OD value) difference (ΔOD) evaluation | A | A | B | C C C | C C | C C | C |

(*1): Produced by Kao Corporation, numerical values in table indicate active ingredient amounts.
(*2): Ethylene oxide (10 mole) adduct of acetylene diol, produced by Nissin Chemical Industry Co., Ltd.
(*3): Produced by Chisso Corporation (weight average molecular weight: 4000), numerical values in table indicate active ingredient amounts.
(*4): Unneutralized product of polyallylamine (weight average molecular weight: 3000), produced by Nitto Boseki Co., Ltd., active ingredient amount = 20% by weight, numerical values in table indicate active ingredient amounts.
(*5): Produced by Junsei Chemical Co., Ltd. (weight average molecular weight: 1800).
(*6): Produced by Junsei Chemical Co., Ltd. (weight average molecular weight: 1200).
(*7): Produced by Junsei Chemical Co., Ltd. (weight average molecular weight: 600).
(*8): Polyvinyl pyrrolidone produced by BASF (weight average molecular weight: 2000 to 3000).
(*9): Produced by Kyowa Hakko Bio Co., Ltd.

As shown in Table 6, the decrease in the optical density (OD value) of the magenta patch was suppressed in the low temperature-high humidity environment in Examples 13 to 22, probably for the following reason. That is, it is estimated that the water-based inks of Examples 13 to 22 contain the dye represented by the general formula (1) and the cationic polymer. The decrease in the optical density (OD value) of the magenta patch was more suppressed in the low temperature-high humidity environment in Examples 13 to 18, 20, and 21 in which the cationic polymer having the weight average molecular weight of not less than 1200 was used and the blending amount of the cationic polymer with respect to the total amount of the water-based ink was not less than 0.5% by weight and not more than 2.5% by weight.

On the other hand, in Comparative Example 5 in which the cationic polymer was not used, the filling effect was not expressed, and the decrease in the optical density (OD value) of the magenta patch was caused in the low temperature-high humidity environment. Also in Comparative Examples 6 to 8 which used polyvinyl pyrrolidone as a non-cationic polymer or lysine hydrochloride or dimethyl ethyloctyl ammonium ethylsulfate as a cationic low molecular weight substance in place of the cationic polymer, the filling effect was not expressed, and the decrease in the optical density (OD value) of the magenta patch was caused in the low temperature-high humidity environment.

As described above, the water-based ink of the present teaching provides the satisfactory hue, and the water-based ink is excellent in the durability or stoutness against light, heat, and ozone, wherein the decrease in the optical density (OD value) is suppressed in the high humidity environment. The way of use of the water-based ink of the present teaching is not specifically limited, and the water-based ink is widely applicable to various types of ink-jet recording.

Examples 23 to 33 and Comparative Examples 9 to 16

(a) Preparation of water-based yellow ink and measurement of migration level

Respective components of a water-based yellow ink composition (Table 7), from which each of the cationic polymer and the comparative object thereof was excluded or removed, were mixed uniformly. After that, an obtained mixture was filtrated by using a hydrophilic polytetrafluoroethylene (PTFE) type membrane filter (pore size: 0.20 μm) produced by Toyo Roshi Kaisha, Ltd. Accordingly, water-based yellow inks for ink jet recording for measuring the migration levels were obtained. Subsequently, the evaluation sample was prepared such that fifteen patches, each of which had a slit to divide a solid image into two, were recorded on the glossy paper having a void-type resin coat layer by using each of the water-based yellow inks for measuring the migration level by using an ink jet printer-equipped digital multifunction machine DCP-385C produced by Brother Industries, Ltd. "Exclusive paper (photograph glossy paper) (BP-71)" (Glossy paper A) produced by Brother Industries, Ltd., "Photograph paper Crispia <Highly Glossy>" (Glossy paper B), and "Photograph paper <Glossy>" (Glossy paper C) produced by Seiko Epson Corp. were used as the glossy paper having the void-type resin coat layer. Subsequently, the evaluation sample was used to measure the migration level of each of the water-based yellow inks. The measured migration levels are shown in Tables 10 and 11.

After the measurement of the migration level, each of the cationic polymer and the comparative object thereof shown in Table 1 was added to each of the water-based yellow inks for measuring the migration level, if necessary. The mixing and the filtration were performed in the same manner as in the preparation of each of the water-based yellow inks for measuring the migration level. Thus, water-based yellow inks Y21 to Y29 for ink jet recording were obtained. In Table 7, the dyes (Ya) to (Ye) are the compounds represented by the chemical formulas (Ya) to (Ye) described above respectively. The water-based yellow inks Y21, Y23, Y25 to Y29 shown in Table 7 have the same compositions as those of the water-based yellow inks Y1 to Y3, Y7, Y11 to Y13 shown in Table 1 respectively.

(b) Preparation of Water-Based Magenta Ink and Measurement of Migration Level

Respective components of a water-based magenta ink composition (Table 8), from which the cationic polymer was excluded or removed, were mixed uniformly. After that, an obtained mixture was filtrated by using a hydrophilic polytetrafluoroethylene (PTFE) type membrane filter (pore size: 0.20 μm) produced by Toyo Roshi Kaisha, Ltd. Accordingly, water-based magenta inks for measuring the migration levels were obtained. Subsequently, the migration level of each of the water-based magenta inks for measuring the migration level was measured in the same manner as each of the water-based yellow inks for measuring the migration level. The measured migration levels are shown in Tables 10 and 11.

After the measurement of the migration level, each of the cationic polymer and the comparative object thereof shown in Table 8 was added to each of the water-based magenta inks for measuring the migration level, if necessary. The mixing and the filtration were performed in the same manner as in the preparation of each of the water-based magenta inks for measuring the migration level. Thus, water-based magenta inks M11 to M22 for ink jetrecording were obtained. In Table 8, the dyes (M1a) to (M1b), the dyes (M2a) to (M2e), and the dyes (1-A) to (1-E) are the compounds represented by the chemical formulas (M1a) to (M1b), the chemical formulas (M2a) to (M2e), and the chemical formulas (1-A) to (1-E) described above respectively. The water-based magenta inks M19 and M20 shown in Table 8 have the same compositions as those of the water-based magenta inks M2 and M3 shown in Table 2 respectively.

(c) Preparation of water-based cyan ink and measurement of migration level

Respective components of a water-based cyan ink composition (Table 9), from which the cationic polymer was excluded or removed, were mixed uniformly. After that, an obtained mixture was filtrated by using a hydrophilic polytetrafluoroethylene (PTFE) type membrane filter (pore size: 0.20 μm) produced by Toyo Roshi Kaisha, Ltd. Accordingly, cyan inks for measuring the migration levels were obtained. Subsequently, the migration level of each of the water-based cyan inks for measuring the migration level was measured in the same manner as each of the water-based yellow inks for measuring the migration level. The measured migration levels are shown in Tables 10 and 11.

After the measurement of the migration level, the cationic polymer shown in Table 9 was added to each of the water-based cyan inks for measuring the migration level, if necessary. The mixing and the filtration were performed in the same manner as in the preparation of each of the water-based cyan inks for measuring the migration level. Thus, water-based cyan inks C11 to C16 for ink jetrecording were obtained. In Table 9, the dyes (Ca) to (Ce) are the compounds represented by the chemical formulas (Ca) to (Ce) described above respectively. The water-based cyan inks C12 to C16 shown in Table 9 have the same compositions as those of the water-based cyan inks C1 to C5 shown in Table 3 respectively.

TABLE 7

|  |  | Y21 | Y22 | Y23 | Y24 | Y25 |
|---|---|---|---|---|---|---|
| Water-based Yellow Ink Composition (% by weight) | Dye (Ya) | 2.70 | — | — | — | 2.70 |
|  | Dye (Yb) | — | 2.70 | — | — | — |
|  | Dye (Yc) | — | — | — | — | — |
|  | Dye (Yd) | — | — | 2.70 | — | — |
|  | Dye (Ye) | — | — | — | 2.70 | — |
|  | Glycerol (*1) | 23.5 | 25.0 | 26.0 | 23.5 | 23.5 |
|  | Diethylene glycol | 3.00 | 3.00 | 3.00 | 3.00 | 3.00 |
|  | Dipropylene glycol monopropyl ether | 2.00 | 2.00 | 2.00 | 2.00 | 2.00 |
|  | Olfine (trade name) E1010 (*2) | 0.20 | 0.20 | 0.20 | 0.20 | 0.20 |
|  | Polylysine (*3) | 2.5 | 1.0 | — | 2.5 | — |
|  | PAA (trade name)-3(*4) | — | — | — | — | 2.5 |
|  | Polyethyleneimine 1800 (*5) | — | — | — | — | — |
|  | Kollidon 12PF (*6) | — | — | — | — | — |
|  | Lysine hydrochloride (*7) | — | — | — | — | — |
|  | Dimethyl ethyloctyl ammonium ethylsulfate | — | — | — | — | — |
|  | Water | balance | balance | balance | balance | balance |

|  |  | Y26 | Y27 | Y28 | Y29 |
|---|---|---|---|---|---|
| Water-based Yellow Ink Composition (% by weight) | Dye (Ya) | — | — | — | — |
|  | Dye (Yb) | 2.70 | — | — | — |
|  | Dye (Yc) | — | 2.70 | — | — |
|  | Dye (Yd) | — | — | 2.70 | — |
|  | Dye (Ye) | — | — | — | 2.70 |
|  | Glycerol (*1) | 23.5 | 23.5 | 23.5 | 23.5 |
|  | Diethylene glycol | 3.00 | 3.00 | 3.00 | 3.00 |
|  | Dipropylene glycol monopropyl ether | 2.00 | 2.00 | 2.00 | 2.00 |
|  | Olfine (trade name) E1010 (*2) | 0.20 | 0.20 | 0.20 | 0.20 |
|  | Polylysine (*3) | — | — | — | — |
|  | PAA (trade name)-3 (*4) | — | — | — | — |
|  | Polyethyleneimine 1800 (*5) | 2.5 | — | — | — |
|  | Kollidon 12PF (*6) | — | 2.5 | — | — |
|  | Lysine hydrochloride (*7) | — | — | 2.5 | — |
|  | Dimethyl ethyloctyl ammonium ethylsulfate | — | — | — | 2.5 |
|  | Water | balance | balance | balance | balance |

(*1): Produced by Kao Corporation, numerical values in table indicate active ingredient amounts.
(*2): Ethylene oxide (10 mole) adduct of acetylene diol, produced by Nissin Chemical Industry Co., Ltd.
(*3): Produced by Chisso Corporation (weight average molecular weight: 4000), numerical values in table indicate active ingredient amounts.
(*4): Unneutralized product of polyallylamine (weight average molecular weight: 3000), produced by Nitto Boseki Co., Ltd., active ingredient amount = 20% by weight, numerical values in table indicate active ingredient amounts.
(*5): Produced by Junsei Chemical Co., Ltd. (weight average molecular weight: 1800).
(*6): Polyvinyl pyrrolidone produced by BASF (weight average molecular weight: 2000 to 3000).
(*7): Produced by Kyowa Hakko Bio Co., Ltd.

TABLE 8

|  |  | M11 | M12 | M13 | M14 | M15 | M16 |
|---|---|---|---|---|---|---|---|
| Water-based Magenta Ink Composition (% by weight) | Dye (M1a) | 3.00 | — | — | — | — | — |
| | Dye (M2a) | — | 3.00 | — | — | — | — |
| | Dye (M2a) | — | — | 3.00 | — | — | — |
| | Dye (M2b) | — | — | — | 3.00 | — | — |
| | Dye (M2c) | — | — | — | — | 3.00 | — |
| | Dye (M2d) | — | — | — | — | — | 3.00 |
| | Dye (M2e) | — | — | — | — | — | — |
| | Dye (1-A) | — | — | — | — | — | — |
| | Dye (1-B) | — | — | — | — | — | — |
| | Dye (1-C) | — | — | — | — | — | — |
| | Dye (1-D) | — | — | — | — | — | — |
| | Dye (1-E) | — | — | — | — | — | — |
| | Glycerol (*1) | 26.0 | 26.0 | 26.0 | 26.0 | 26.0 | 26.0 |
| | Diethylene glycol | 3.00 | 3.00 | 3.00 | 3.00 | 3.00 | 3.00 |
| | Dipropylene glycol monopropyl ether | 2.00 | 2.00 | 2.00 | 2.00 | 2.00 | 2.00 |
| | Olfine (trade name) E1010 (*2) | 0.20 | 0.20 | 0.20 | 0.20 | 0.20 | 0.20 |
| | Polylysine (*3) | — | — | — | — | — | — |
| | Water | balance | balance | balance | balance | balance | balance |

|  |  | M17 | M18 | M19 | M20 | M21 | M22 |
|---|---|---|---|---|---|---|---|
| Water-based Magenta Ink Composition (% by weight) | Dye (M1a) | — | — | — | — | — | — |
| | Dye (M2a) | — | — | — | — | — | — |
| | Dye (M2a) | — | — | — | — | — | — |
| | Dye (M2b) | — | — | — | — | — | — |
| | Dye (M2c) | — | — | — | — | — | — |
| | Dye (M2d) | — | — | — | — | — | — |
| | Dye (M2e) | 3.00 | — | — | — | — | — |
| | Dye (1-A) | — | 3.50 | — | — | — | — |
| | Dye (1-B) | — | — | 3.50 | — | — | — |
| | Dye (1-C) | — | — | — | 3.50 | — | — |
| | Dye (1-D) | — | — | — | — | 3.50 | — |
| | Dye (1-E) | — | — | — | — | — | 3.50 |
| | Glycerol (*1) | 26.0 | 26.0 | 26.0 | 26.0 | 23.5 | 23.5 |
| | Diethylene glycol | 3.00 | 3.00 | 3.00 | 3.00 | 3.00 | 3.00 |
| | Dipropylene glycol monopropyl ether | 2.00 | 2.00 | 2.00 | 2.00 | 2.00 | 2.00 |
| | Olfine (trade name) E1010 (*2) | 0.20 | 0.20 | 0.20 | 0.20 | 0.20 | 0.20 |
| | Polylysine (*3) | — | — | — | — | 2.50 | 2.50 |
| | Water | balance | balance | balance | balance | balance | balance |

(*1): Produced by Kao Corporation, numerical values in table indicate active ingredient amounts.
(*2): Ethylene oxide (10 mole) adduct of acetylene diol, produced by Nissin Chemical Industry Co., Ltd.
(*3): Produced by Chisso Corporation (weight average molecular weight: 4000), numerical values in table indicate active ingredient amounts.

TABLE 9

|  |  | C11 | C12 | C13 | C14 | C15 | C16 |
|---|---|---|---|---|---|---|---|
| Water-based Cyan Ink Composition (% by weight) | C.I. Acid Blue 9 | 3.50 | — | — | — | — | — |
| | Dye (Ca) | — | 3.50 | — | — | — | — |
| | Dye (Cb) | — | — | 3.50 | — | — | — |
| | Dye (Cc) | — | — | — | 3.50 | — | — |
| | Dye (Cd) | — | — | — | — | 3.50 | — |
| | Dye (Ce) | — | — | — | — | — | 3.50 |
| | Glycerol (*1) | 26.0 | 23.5 | 26.0 | 26.0 | 26.0 | 26.0 |
| | Diethylene glycol | 3.00 | 3.00 | 3.00 | 3.00 | 3.00 | 3.00 |
| | Dipropylene glycol monopropyl ether | 2.00 | 2.00 | 2.00 | 2.00 | 2.00 | 2.00 |
| | Olfine (trade name) E1010 (*2) | 0.20 | 0.20 | 0.20 | 0.20 | 0.20 | 0.20 |
| | Polylysine (*3) | — | 2.50 | — | — | — | — |
| | Water | balance | balance | balance | balance | balance | balance |

(*1): Produced by Kao Corporation, numerical values in table indicate active ingredient amounts.
(*2): Ethylene oxide (10 mole) adduct of acetylene diol, produced by Nissin Chemical Industry Co., Ltd.
(*3): Produced by Chisso Corporation (weight average molecular weight: 4000), numerical values in table indicate active ingredient amounts.

(d) Evaluation of Ink-Jet Recording Method

An ink jet printer-equipped digital multifunction machine DCP-385C produced by Brother Industries, Ltd. was used to record a tri-color black patch on the glossy paper by using the three color water-based inks (water-based yellow ink: water-based magenta ink: water-based cyan ink (volume ratio)=1:1:1) shown in Tables 10 and 11. Sheets of the glossy paper, which were used in Examples and Comparative Examples respectively, are shown in Tables 10 and 11. The three color water-based inks were discharged in an order of the water-based ink 1, the water-based ink 2, and the water-based ink 3 shown in Tables 10 and 11 so that they are brought in contact with each other on the glossy paper. The chromaticness (C*) difference (AC*) was calculated for the tri-color black patch in accordance with the same method as that used in Examples 1 to 12 described above, and the evaluation was performed on the basis of the same evaluation criteria. The evaluation results of Examples and Comparative Examples are shown in Tables 10 and 11.

TABLE 10

|  | Example | | | | | |
|---|---|---|---|---|---|---|
|  | 23 | 24 | 25 | 26 | 27 | 28 |
| Water-based ink 1 | Y21 | Y25 | Y26 | Y22 | Y23 | Y23 |
| Migration level | 5 | 5 | 5 | 5 | 5 | 5 |
| Cationic Type | polylysine | PAA (trade name)-3 | poly-ethylene-imine 1800 | polylysine | — | — |
| polymer Blending amount | 2.5 | 2.5 | 2.5 | 1 | — | — |
| Water-based ink 2 | C13 | C14 | C15 | C16 | C12 | C13 |
| Migration level | 2 | 2 | 2 | 2 | 2 | 2 |
| Cationic Type | — | — | — | — | polylysine | — |
| polymer Blending amount | — | — | — | — | 2.5 | — |
| Water-based ink 3 | M18 | M19 | M20 | M18 | M19 | M21 |
| Migration level | 9 | 9 | 9 | 9 | 9 | 9 |
| Cationic Type | — | — | — | — | — | polylysine |
| polymer Blending amount | — | — | — | — | — | 2.5 |
| Glossy paper | A | A | A | A | A | A |
| Chromaticness (C*) difference (ΔC*) evaluation | A | A | A | A | A | A |

|  | Example | | | | |
|---|---|---|---|---|---|
|  | 29 | 30 | 31 | 32 | 33 |
| Water-based ink 1 | C14 | Y21 | Y24 | Y21 | Y24 |
| Migration level | 2 | 5 | 5 | 5 | 4 |
| Cationic Type | polylysine | polylysine | polylysine | polylysine | polylysine |
| polymer Blending amount | 2.5 | 2.5 | 2.5 | 2.5 | 2.5 |
| Water-based ink 2 | Y23 | C15 | C11 | C16 | C13 |
| Migration level | 5 | 2 | 12 | 2 | 2 |
| Cationic Type | — | — | — | — | — |
| polymer Blending amount | — | — | — | — | — |
| Water-based ink 3 | M20 | M11 | M13 | M20 | M18 |
| Migration level | 9 | 14 | 6 | 9 | 9 |
| Cationic Type | — | — | — | — | — |
| polymer Blending amount | — | — | — | — | — |
| Glossy paper | A | A | A | B | C |
| Chromaticness (C*) difference (ΔC*) evaluation | A | B | B | A | A |

TABLE 11

|  | Comparative Example | | | | | | | |
|---|---|---|---|---|---|---|---|---|
|  | 9 | 10 | 11 | 12 | 13 | 14 | 15 | 16 |
| Water-based ink 1 | Y23 | Y27 | Y28 | Y29 | C14 | Y23 | Y23 | C11 |
| Migration level | 5 | 5 | 5 | 5 | 2 | 5 | 5 | 12 |
| Cationic polymer comparative object Type | — | Kollidon 12PF | lysine hydrochloride | dimethyl ethyl octyl ammonium ethylsulfate | — | — | — | — |
| Blending amount | — | 2.5 | 2.5 | 2.5 | — | — | — | — |
| Water-based ink 2 | C14 | C15 | C16 | C13 | Y23 | C15 | C11 | Y21 |
| Migration level | 2 | 2 | 2 | 2 | 5 | 2 | 12 | 5 |
| Cationic Type | — | — | — | — | — | — | — | polylysine |
| polymer Blending amount | — | — | — | — | — | — | — | 2.5 |
| Water-based ink 3 | M19 | M20 | M18 | M19 | M20 | M12 | M14 | M15 |
| Migration level | 9 | 9 | 9 | 9 | 9 | 14 | 6 | 6 |
| Cationic Type | — | — | — | — | — | — | — | — |
| polymer Blending amount | — | — | — | — | — | — | — | — |
| Glossy paper | A | A | A | A | A | A | A | A |
| Chromaticness (C*) difference (ΔC*) evaluation | C | C | C | C | C | C | C | C |

As shown in Table 10, in Examples 23 to 33, even in the case of the combination of the water-based inks in which the large difference in the migration level is provided therebetween, the change of the chromaticness (C*) of the tri-color black patch was suppressed in the low temperature-high humidity environment, probably for the following reason. That is, it is considered that the ink-jet recording method of Example 28 fulfills Condition (V) described above, and the ink jet recording methods of Examples 23 to 27 and Examples 29 to 33 fulfill Condition (VI) described above. In Examples 23 to 29 and Examples 32 and 33, the water-based ink, which has the maximum migration level, contains the dye represented by the general formula (1). Therefore, the ink jetrecording method of Example 28 fulfills Condition (III) described above, and the ink-jet recording methods of Examples 23 to 27 and Examples 29, 32, and 33 fulfill Condition (IV) described above.

Further, in Examples 23 to 29 and Examples 32 and 33 in which the maximum value of the migration level was less than 10, the change of the chromaticness (C*) of the tri-color black patch was more suppressed in the low temperature-high humidity environment.

On the other hand, in Comparative Examples 9, 13 to 15 in which the water-based ink containing the cationic polymer was not used, the filling effect was not expressed, and the great change was caused in the chromaticness (C*) of the tri-color black patch in the low temperature-high humidity environment. Also in Comparative Examples 10 to 12 each of which used the water-based ink containing polyvinyl pyrrolidone as a non-cationic polymer or lysine hydrochloride or dimethyl ethyloctyl ammonium ethylsulfate as a cationic low molecular weight substance in place of the cationic polymer, the filling effect was not expressed, and the great change was caused in the chromaticness (C*) of the tri-color black patch in the low temperature-high humidity environment. Also in Comparative Example 16 in which the water-based ink containing the cationic polymer was discharged after the water-based ink having the maximum migration level, the filling effect was not expressed, and the great change was caused in the chromaticness (C*) of the tri-color black patch in the low temperature-high humidity environment.

As described above, according to the ink-jet recording method of the present teaching, even in the case of the combination of the water-based inks in which the difference in the migration level therebetween is relatively large, it is possible to suppress the color change of the recorded portion of the secondary color in the high humidity environment. The way of use of the ink jetrecording method of the present teaching is not specifically limited, and the ink-jet recording method is widely applicable to various types of ink-jet recording apparatuses.

What is claimed is:

1. A water-based ink set for ink-jet recording, comprising: two or more water-based inks each of which contains a colorant, water, and a water-soluble organic solvent;
wherein at least one ink among the two or more water-based inks contains a dye represented by a general formula (1), and at least one ink among the two or more water based inks contains a cationic polymer
a weight average molecular weight of the cationic polymer is 1200 to 4000, and
the at least one ink, among the two or more water-based inks, containing the dye represented by the general formula (1) is different from the at least one ink, among the two or more water-based inks, containing the cationic polymer,

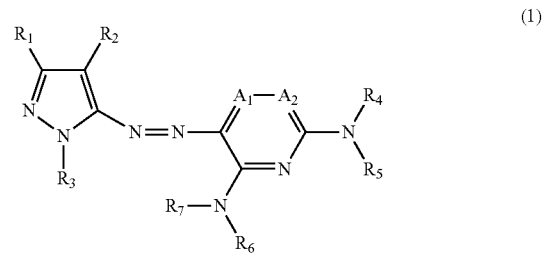

in the general formula (1):
$R_1$ represents a hydrogen atom, a substituted or unsubstituted alkyl group, or a substituted or unsubstituted aryl group; and $R_2$ represents a hydrogen atom, a halogen atom, or a cyano group;
$R_3$ represents a hydrogen atom, a substituted or unsubstituted alkyl group, a substituted or unsubstituted aryl group, or a substituted or unsubstituted heterocyclic group;
each of $R_4$, $R_5$, $R_6$, and $R_7$ is a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group; $R_4$, $R_5$, $R_6$, and $R_7$ are identical with each other or different from each other; $R_4$ and $R_5$ are not simultaneously the hydrogen atom; and $R_6$ and $R_7$ are not simultaneously the hydrogen atom; and
both of $A_1$ and $A_2$ are substituted or unsubstituted carbon atoms, or one of $A_1$ and $A_2$ is a substituted or unsubstituted carbon atom and the other of $A_1$ and $A_2$ is a nitrogen atom.

2. The water-based ink set for ink jet recording according to claim 1, wherein the following Condition (I) is fulfilled:
Condition (I): the dye represented by the general formula (1) is contained in at least one water-based ink among the two or more water-based inks and the cationic polymer is contained in at least one different water-based ink, among the two or more water-based inks, which is different from the at least one ink containing the dye represented by the general formula (1).

3. The water-based ink set for ink jet recording according to claim 1, wherein the cationic polymer includes at least one selected from the group consisting of polylysine, polyallylamine, and polyethyleneimine.

4. The water-based ink set for ink jet recording according to claim 1, wherein the cationic polymer is contained by not less than 0.5% by weight in the at least one water-based ink containing the cationic polymer.

5. An ink-jet recording method for performing recording on a recording medium, comprising:
preparing the water-based ink set for ink-jet recording as defined in claim 1; and
overprinting the two or more water-based inks,
wherein the following Condition (IV) is fulfilled:
Condition (IV): among the two or more water-based inks which are to be overprinted, a water-based ink, which arrives at the recording medium before or simultaneously with the water-based ink containing the dye represented by the general formula (1), contains the cationic polymer.

6. An ink-jet recording method for performing recording on a recording medium, comprising:

preparing two or more water-based inks each of which contains a colorant, water, and a water-soluble organic solvent; and overprinting the two or more water-based inks, wherein at least one of following Conditions (V) and (VI) is fulfilled:

Condition (V): among the two or more water-based inks which are to be overprinted, a water-based ink, which has a maximum migration level, contains a cationic polymer; and Condition (VI): among the two or more water-based inks which are to be overprinted, a water-based ink, which arrives at the recording medium before or simultaneously with the water-based ink having the maximum migration level, contains the cationic polymer, wherein a weight average molecular weight of the cationic polymer is 1200 to 4000, and a dye represented by a general formula (1) is contained in at least one water-based ink among the two or more water-based inks, which is different from the water-based ink containing the cationic polymer,

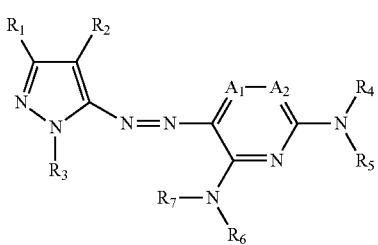

(1)

in the general formula (1):

$R_1$ represents a hydrogen atom, a substituted or unsubstituted alkyl group, or a substituted or unsubstituted aryl group; and $R_2$ represents a hydrogen atom, a halogen atom, or a cyano group;

$R_3$ represents a hydrogen atom, a substituted or unsubstituted alkyl group, a substituted or unsubstituted aryl group, or a substituted or unsubstituted heterocyclic group;

each of $R_4$ $R_5$ $R_6$ and $R_7$ is a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group; $R_4$ $R_5$ $R_6$ and $R_7$ are identical with each other or different from each other; $R_4$ and $R_5$ are not simultaneously the hydrogen atom; and $R_6$ and $R_7$ are not simultaneously the hydrogen atom; and both of $A_1$ and $A_2$ are substituted or unsubstituted carbon atoms, or one of $A_1$ and $A_2$ is a substituted or unsubstituted carbon atom and the other of $A_1$ and $A_2$, is a nitrogen atom.

7. The ink jet recording method according to claim 6, wherein the maximum migration level is less than 10.

8. The ink-jet recording method according to claim 6, wherein the cationic polymer includes at least one selected from the group consisting of polylysine, polyallylamine, and polyethyleneimine.

9. The ink jet recording method according to claim 6, wherein the water-based ink, which has the maximum migration level, contains the dye represented by the general formula (1).

10. The ink jet recording method according to claim 6, wherein the recording medium is glossy paper having silica particles on a surface thereof.

11. A water-based ink set used for the ink jet recording method as defined in claim 6, comprising the two or more water-based inks, wherein the water-based ink, which has the maximum migration level, contains the cationic polymer.

12. The water-based ink set for ink jet recording according to claim 1, wherein the cationic polymer is polylysine.

13. The ink-jet recording method according to claim 6, wherein the cationic polymer is polylysine.

14. The ink jet recording method according to claim 6, wherein the two or more water-based inks include a yellow ink, a magenta ink and a cyan ink, and a migration level of the yellow ink (ML of Y), a migration level of the magenta ink (ML of M), and a migration level of the cyan ink (ML of C), fulfill following Condition (i) or (ii):

Condition (i): (ML of M) >(ML of Y)>(ML of C)

Condition (ii): (ML of C) >(ML of M)>(ML of Y)

wherein when the migration level of the yellow ink (ML of Y), the migration level of the magenta ink (ML of M), and the migration level of the cyan ink (ML of C), fulfill the Condition (ii), the cationic polymer is contained in the yellow ink.

* * * * *